(12) United States Patent
Discenzo

(10) Patent No.: US 6,847,854 B2
(45) Date of Patent: Jan. 25, 2005

(54) SYSTEM AND METHOD FOR DYNAMIC MULTI-OBJECTIVE OPTIMIZATION OF MACHINE SELECTION, INTEGRATION AND UTILIZATION

(75) Inventor: Frederick M. Discenzo, Brecksville, OH (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 0 days.

(21) Appl. No.: 10/214,927

(22) Filed: Aug. 7, 2002

(65) Prior Publication Data

US 2003/0061004 A1 Mar. 27, 2003

Related U.S. Application Data

(60) Provisional application No. 60/311,880, filed on Aug. 13, 2001, and provisional application No. 60/311,596, filed on Aug. 10, 2001.

(51) Int. Cl.$^7$ ............................ G05B 19/00; G06F 19/00
(52) U.S. Cl. ............................ 700/99; 700/28; 700/36; 700/90; 705/8
(58) Field of Search ............................ 700/28, 90, 95, 700/99, 32, 36; 702/108; 318/609; 705/8

(56) References Cited

U.S. PATENT DOCUMENTS

| 5,311,123 A | * | 5/1994 | Webster et al. ............. 324/111 |
| 5,737,215 A | * | 4/1998 | Schricker et al. ............. 700/29 |
| 5,917,428 A | * | 6/1999 | Discenzo et al. ...... 340/870.01 |
| 6,119,074 A | * | 9/2000 | Sarangapani ................. 702/185 |
| 6,330,525 B1 | * | 12/2001 | Hays et al. .................. 702/183 |
| 6,560,549 B2 | * | 5/2003 | Fonkalsrud et al. .......... 702/41 |
| 6,567,752 B2 | * | 5/2003 | Cusumano et al. ........... 702/34 |

* cited by examiner

Primary Examiner—Jayprakash N. Gandhi
(74) Attorney, Agent, or Firm—Amin & Turocy LLP; R. Scott Speroff

(57) ABSTRACT

The invention provides control systems and methodologies for controlling a process having one or more motorized pumps and associated motor drives, which provide for optimized process performance according to one or more performance criteria, such as efficiency, component life expectancy, safety, emissions, noise, vibration, operational cost, or the like. More particularly, the subject invention provides for employing machine diagnostic and/or prognostic information in connection with optimizing an overall business operation.

33 Claims, 19 Drawing Sheets

Cost Function Response Surface and Steepest Decent Technique

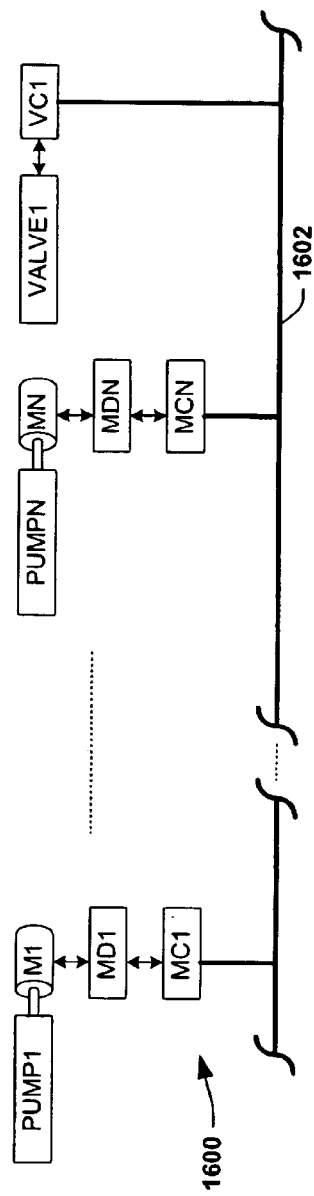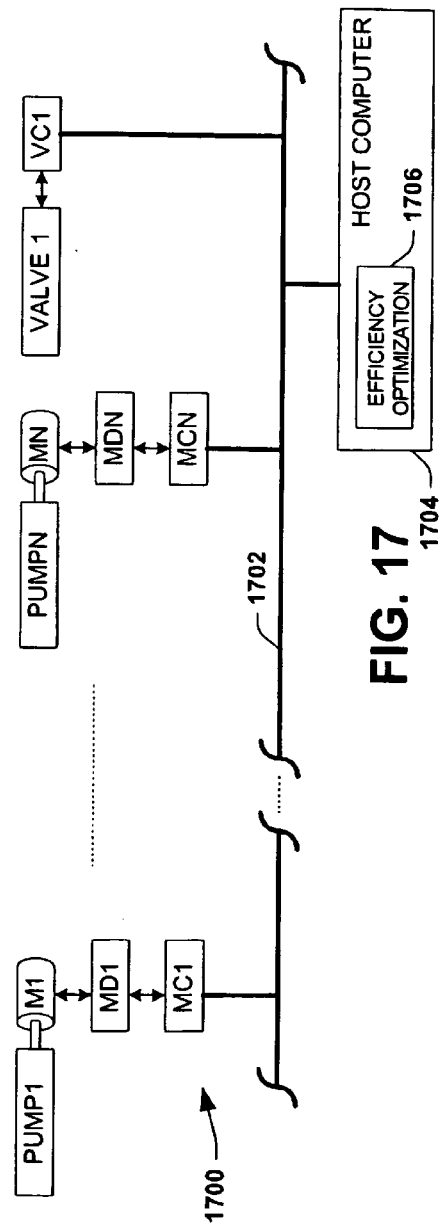

SYSTEM AND METHOD FOR DYNAMIC MULTI-OBJECTIVE OPTIMIZATION OF MACHINE SELECTION, INTEGRATION AND UTILIZATION

CROSS REFERENCE TO RELATED APPLICATIONS

The present application claims the benefit of U.S. Provisional Patent Application Ser. No. 60/311,880, filed Aug. 13, 2001, entitled INTELLIGENT PUMPING SYSTEMS ENABLE NEW OPPORTUNITIES FOR ASSET MANAGEMENT AND ECONOMIC OPTIMIZATION, and U.S. Provisional Patent Application Ser. No. 60/311,596, filed Aug. 10, 2001, entitled INTELLIGENT PUMPING SYSTEMS ENABLE NEW OPPORTUNITIES FOR ASSET MANAGEMENT AND ECONOMIC OPTIMIZATION; of which the entireties of both applications are incorporated herein by reference.

TECHNICAL FIELD

The present invention relates to the art of electric machines (e.g., motors, pumps and components thereof) and more particularly to control system and methods for selecting, controlling and optimizing utilization of machinery primarily in an industrial automation environment. The invention provides for integration of control methods and strategies with decision support and logistics systems to optimize specifically defined operational and performance objectives.

BACKGROUND OF THE INVENTION

The global economy has forced many businesses to operate and conduct business in an ever increasingly efficient manner due to increased competition. Accordingly, inefficiencies that were once tolerated by corporations, due to a prior parochial nature of customers and suppliers, now have to be removed or mitigated so that the respective corporations can effectively compete in a vastly dynamic marketplace. Furthermore, intense desire to operate "green" facilities that are environmentally friendly and to insure worker safety provides additional motivation to minimize waste, scrap, and insure a reliable, safe process that will not fail unexpectedly.

Many industrial processes and machines are controlled and/or powered by electric motors. Such processes and machines include pumps providing fluid transport for chemical and other processes, fans, conveyor systems, compressors, gear boxes, motion control devices, screw pumps, and mixers, as well as hydraulic and pneumatic machines driven by motors. Such motors are combined with other system components, such as valves, pumps, furnaces, heaters, chillers, conveyor rollers, fans, compressors, gearboxes, and the like, as well as with appropriate motor drives, to form industrial machines and actuators. For example, an electric motor may be combined with a motor drive providing variable electrical power to the motor, as well as with a pump, whereby the motor rotates the pump shaft to create a controllable pumping system.

The components parts used to build such motorized systems (e.g., pumps, motors, motor drives . . . ) are commonly chosen according to specifications for a particular application or process in which the motorized system is to be employed. For instance, a set of specifications for a motorized pumping system may include flow rates or pressures or ranges thereof, which the system must accommodate for use in a particular application. In such a case, the pump is chosen according to the maximum and minimum flow and head required in the application, and the motor is selected based on the chosen pump. The corresponding motor drive is selected according to the motor specifications. Other pumping system components may then be selected according to the chosen motor, pump, and motor drive, which may include motor speed sensors, pressure sensors, flow sensors, and the like.

Such system design specifications are typically driven by maximum operating conditions, such as the maximum flow rate the pumping system is to achieve, which in turn drives the specifications for the component parts. For instance, the motor may be selected according to the ability to provide the necessary shaft speed and torque for the pump to achieve the maximum required flow rate required for the process. Thus, the typical motorized system comprises components rated according to maximum operational performance needed. However, the system may seldom, if ever, be operated at these levels. For example, a pump system rated to achieve a maximum flow rate of 100 gallons per minute (GPM) may be operated at a much lower flow rate for the majority of its operating life.

In facilities where such motorized systems are employed, other operational performances characteristics may be of interest, apart from the rated output of the motorized system. For instance, the cost of operating a pumping system is commonly of interest in a manufacturing facility employing the system. The component parts of such a pumping system typically include performance ratings or curves relating to the efficiency of the component parts at various operating conditions. The energy efficiency, for example, may be a measure of the transferred power of the component device, which may be expressed as a percentage of the ratio of output power (e.g., power delivered by the device) to input power (e.g., power consumed by the device). These performance curves typically include one or more operating points at which the component operates at maximum efficiency. In addition to the optimal efficiency operating point, the components may have other operating points at which other performance characteristics are optimal, such as expected lifetime, mean time between failures (MTBF), acoustic emissions or vibration output, time between expected servicing, safety, pollution emissions, or the like.

While the operating specifications for the components in a motorized (e.g., pumping) system may provide for component device selection to achieve one or more system operational maxima (e.g., maximum flow rate for a pumping system), other performance metrics (e.g., efficiency, cost, lifetime, MTBF, etc.) for the components and/or the system of which they form a part, are not typically optimal at the actual operating conditions. Thus, even where the efficiency ratings for a pump, motor, and motor drive in a motorized pumping system provide for maximum efficiency at or near the maximum flow rate specified for the pumping system, the efficiency of one or more of these components (e.g., as well as that of the pumping system overall) may be relatively poor for other flow rates at which the system may operate for the majority of the service life thereof. In addition, motors, pumps, and drives are sized to meet the application requirements. Each of these components have different operating characteristics such that the efficient operating point of a motor is at a different speed and load than the efficient operating point of the connected pump. Separate selection of components based on cost or individual efficiencies will result in an integrated system that is sub-optimal with regard to efficiency, throughput, or other optimization criteria.

Moreover, typically, the specification for such machines or components thereof is performed at an isolated or level of granularity such that higher-level aspects of a business or industrial concern are overlooked. Thus, there is a need for methods and systems by which efficiency and other performance characteristics associated with selecting and utilizing motorized systems and components thereof may be improved.

SUMMARY OF THE INVENTION

The following presents a simplified summary of the invention in order to provide a basic understanding of one or more aspects of the invention. This summary is not an extensive overview of the invention. It is intended to neither identify key or critical elements of the invention, nor to delineate the scope of the present invention. Rather, the sole purpose of this summary is to present some concepts of the invention in a simplified form as a prelude to the more detailed description that is presented hereinafter.

The invention provides control systems and methodologies for controlling a process having one or more motorized pumps and associated motor drives, which provide for optimized process performance according to one or more performance criteria, such as efficiency, component life expectancy, safety, electromagnetic emissions, noise, vibration, operational cost, or the like. More particularly, the subject invention provides for employing machine diagnostic and/or prognostic information in connection with optimizing an overall business operation. For example, such machine data can be employed in connection with inventory control, production, marketing, utilities, profitablility, accounting, and other business concerns. Thus, the present invention abstracts such machine data so that it can be employed in connection with optimizing overall business operations as compared to many conventional systems that employ machine data solely in connection with machine maintenance, control and possibly process control or optimal control methods.

Aspects of the subject invention employ various high-level data analysis, modeling and utilization schemes in connection with providing some of the advantages associated with the invention. For example, Bayesian Belief Networks can be employed in connection with the subject invention. A probabilistic determination model and analysis can be performed at various levels of data to factor the probabilistic effect of an event on various business concerns given various levels of uncertainty as well as the costs associated with a making an incorrect inference as to prognosing an event and its associated weight with respect to the overall business concern. The present invention takes into consideration that the benefits of machinery monitoring and condition-based maintenance may be significantly enhanced by integrating real-time diagnostics & prognostics techniques within the framework of an automatic control system. System operation may be prescribed based on the predicted or probabalistic state or condition of the machinery in conjunction with the anticipated workload or demand or probabalistic demand and the business strategy along with other operational and performance constraints. The generated decision space may be evaluated to insure suitably robust and operational and machinery decisions are made that maximize the specified business objective such as revenue generation, life cycle cost, energy utilization, or machinery longevity. Thus the subject invention integrates prognostics with control linked with business objectives and strategies to provide unique opportunities for dynamic compensating control and ultimately for managing and optimizing system asset utilization.

In accordance with another aspect of the invention, an intelligent agent scheme can be employed wherein various machines, physical entities, software entities, can be modeled and represented by intelligent software agents that serve as proxies for the respective machines or entities. These agents can be designed to interact with one another and facilitate converging on various modifications and control of the machines of entities in connection with efficiently optimizing an overall business concern. Lower level agents may collaborate and negotiate to achieve lower level process objectives in an optimal manner and integrate this information to higher level agents. Agents, may compete with each other for limited resources and become antagonistic in order to realize critical objectives in a save, reliable, and optimum manner. Moreover, the agents may comprise a highly distributed system controlling the operation of a complex dynamic process. There may not exist a central point or control or coordination of the system. Rather information is distributed among the various agents. Groups of agents may form clusters to promote meeting operational objectives such as local agent goals as well as to promote collaboration in meeting higher-level system goals and objectives. During negotiation for services and functions, local agents may also provide "cost" information to other agents indicating efficiency, energy utilization, or robustness for example. Agents may assign functions and control modes to particular agents based on a comparison and optimization of the specified cost function or operational objective or objectives to be optimized.

Moreover, it is to be appreciated the subject invention can be employed in connection with initial specification, layout and design of an industrial automation system (e.g., process, factory) such that high-level business objectives (e.g., expected revenue, overhead, throughput, growth) are considered in connection with predicted machine characteristics (e.g., life cycle cost, maintenance, downtime, health, efficiency, operating costs) so as to converge on specifications, layout, and design of the industrial automation system so that a mapping to the high-level business objectives is more closely met as compared to conventional schemes where such layout and design is performed in more or less an ad hoc, manual and arbitrary manner. Integrating information regarding opportunities for real-time prognostics and optimizing control can influence the initial design and configuration of the system to provide additional degrees of freedom and enhance the capability for subsequent prognostics and optimizing and compensating control.

Predicted operating state(s) of the machine may be determined based on expected demand or workload or a probabalistic estimate of future workload or demand. Similarly, expected environment (e.g. temperature, pressure, vibration, . . . ) information and possible expected damage information may be considered in establishing the predicted future state of the system. Undesirable future states of the system may be avoided or deferred through a suitable change in the control while achieving required operating objectives and optimizing established operational and business objectives.

Discussing at least one aspect of the invention at a more granular level, solely for sake of understanding one particular context of the invention, control systems and methods are provided for controlling a motorized system according to a setpoint (e.g., flow rate for a motorized pump system), operating limits, and a diagnostic signal, wherein the diagnostic signal is related to a diagnosed operating condition in the system (e.g., efficiency, motor fault, system component degradation, pump fault, power problem, pump cavitation, etc.). The invention thus provides for controlled operation of motors and motorized systems, wherein operation thereof takes into account desired process performance, such as control according to a process setpoint, as well as one or more other performance characteristics or metrics, related to the motorized system and/or component devices therein, whereby improvements in efficiency and other performance characteristics may be realized with allowable process and machinery operating constraints via consideration of prognostic and optimization data.

According to one aspect of the present invention, a method is provided for controlling a motorized system. A desired operating point is selected within an allowable range of operation about a system setpoint according to performance characteristics associated with a plurality of components in the system. For example, a flow rate setpoint may be provided for a motorized pump system, and a range may be provided (e.g., +/−10%) for the system to operate around the setpoint flow value. This range may correspond to a permissible range of operation where the process equipment is making a good product. The system may be operated at an operating point within this range at which one or more performance characteristics are optimized in accordance with the invention. Thus, for example, where an allowable flow control range and setpoint provide for control between upper and lower acceptable flow rates, the invention provides for selecting the operating point therebetween in order to optimize one or more system and/or component performance characteristics, such as life cycle cost, efficiency, life expectancy, safety, emissions, operational cost, MTBF, noise, and vibration.

Where the motorized system includes an electric motor operatively coupled with a pump and a motor drive providing electrical power to the motor, the performance characteristics may include efficiencies or other metrics related to the motor, the pump, and/or the motor drive. The selection of the desired operating point may comprise correlating one or more of motor efficiency information, pump efficiency information, and motor drive efficiency information in order to derive correlated system efficiency information. The desired operating point may then be selected as the optimum efficiency point within the allowable range of operation according to the correlated system efficiency information. The efficiency of the individual component devices, and hence of the pumping system, may be associated with the cost of electrical energy or power provided to the system. Consequently, the invention may be employed to control the pumping system so as to minimize the power consumed by the system, within the tolerance of the allowable range about the process setpoint.

The invention thus allows a system operator to minimize or otherwise optimize the cost associated with pumping fluid, where for example, the cost per unit fluid pumped is minimized. Alternatively or in combination, other performance characteristics may be optimized or accounted for in the optimization in order to select the desired operating point within the allowable range. For instance, the component performance information may comprise component life cycle cost information, component efficiency information, component life expectancy information, safety information, emissions information, operational cost information, component MTBF information, MTTR, expected repair cost, noise information, and/or vibration information. In this regard, it will be recognized that the value of one or more system performance variables (e.g., temperature, flow, pressure, power, etc.) may be used in determining or selecting the desired operating point, which may be obtained through one or more sensors associated with the system, a model of the system, or a combination of these.

Another aspect of the invention provides a control system for controlling a process having a pump with an associated motor. The control system comprises a motor drive providing electrical power to the motor in a controlled fashion according to a control signal, and a controller providing the control signal to the motor drive according to a desired operating point within an allowable range of operation about a process setpoint. The controller selects the desired operating point according to performance characteristics associated one or more components in the process. The system may further comprise a user interface for obtaining from a user, the setpoint, allowable operating range, component performance information, and/or performance characteristic (s), which are to be optimized.

In addition, the system may obtain such information from a host computer and/or other information systems, scheduling systems, inventory systems, order entry systems, decision support systems, maintenance scheduling systems, accounting systems or control systems among others within a larger process via a network or wireless communications. Moreover, this information may be obtained via a wide area network or global communications network, such as the Internet. In this regard, the optimization of one or more performance characteristics may be optimized on a global, enterprise-wide or process-wide basis, where, for example, a single pump system may be operated at a less than optimal efficiency in order to facilitate the operation of a larger (e.g., multi-pump) process or system more efficiently. A specific pump may provide low throughput and run inefficiently to meet minimum product requirements due to the fact that another system in the enterprise can provide additional processing at a much more cost-effective rate and will be run at maximum throughput.

Yet another aspect of the invention provides for operating a motorized system, wherein a controller operatively associated with the system includes a diagnostic component to diagnose an operating condition associated with the pump. The operating conditions detected by the diagnostic component may include motor or pump faults, or failure and/or degradation, and/or failure prediction (e.g., prognostics) in one or more system components. The controller provides a control signal to the system motor drive according to a setpoint and a diagnostic signal from the diagnostic component according to the diagnosed operating condition in the pump. The diagnostic component may perform signature analysis of signals from one or more sensors associated with the pump or motorized system, in order to diagnose the operating condition.

Thus, for example, signal processing may be performed in order to ascertain wear, failure, remaining useful lifetime, or other deleterious effects on system performance, whereby the control of the system may be modified in order to prevent further degradation, extend the remaining service life of one or more system components, or to prevent unnecessary stress to other system components. In this regard, the diagnostic component may process signals related to flow, pressure, current, noise, vibration, and temperature associated with the motorized system. The altered system control may extend the life of the machinery to maximize throughput while insuring there is not failure for a specified period of time and not longer. Having the machinery live longer than the minimum necessary will require operating the machinery at an even lower level of efficiency. For example our objective may be to maximize throughput or efficiency while just meeting the minimum required lifetime and not longer.

The aforementioned novel features of the subject invention can be employed so as to optimize an overall business commensurate with set business objectives. Moreover, as business needs/objectives change, the invention can provide for dynamic adjustment and/or modification of sub-systems (e.g., machines, business components, configurations, process steps, . . . ) in order to converge toward the new operating mode that achieves the business objective in an optimum manner. Thus, the subject invention extracts and abstracts machine data (e.g., diagnostic and/or prognostic data) and employs such data not only in connection with optimizing machine utilization at a low level, but also to maximize utilization of a machine given constraints associated with high-level business objectives. Various models including simulation models, rule-based system, expert system, or other modeling techniques may be used to establish the range of possible operating conditions and evaluate their potential for optimimizing machinery operation.

It is to be appreciated that in addition to industrial applications, the subject invention can be employed in connection with commercial (e.g. HVAC) and military systems (e.g. Navy ships); and such employment is intended to fall within the scope of the hereto appended claims.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings.

BRIEF DESCRIPTION OF THE DRAWINGS

FIG. 16 is a schematic diagram illustrating an exemplary fluid transfer system having multiple pump and valve controllers networked for peer-to-peer communication according to an aspect of the invention;

FIG. 17 is a schematic diagram illustrating another exemplary fluid transfer system having a host computer as well as multiple pump and valve controllers networked for peer-to-peer and/or host-to-peer communication according to an aspect of the invention;

DETAILED DESCRIPTION OF THE INVENTION

Figure 1:
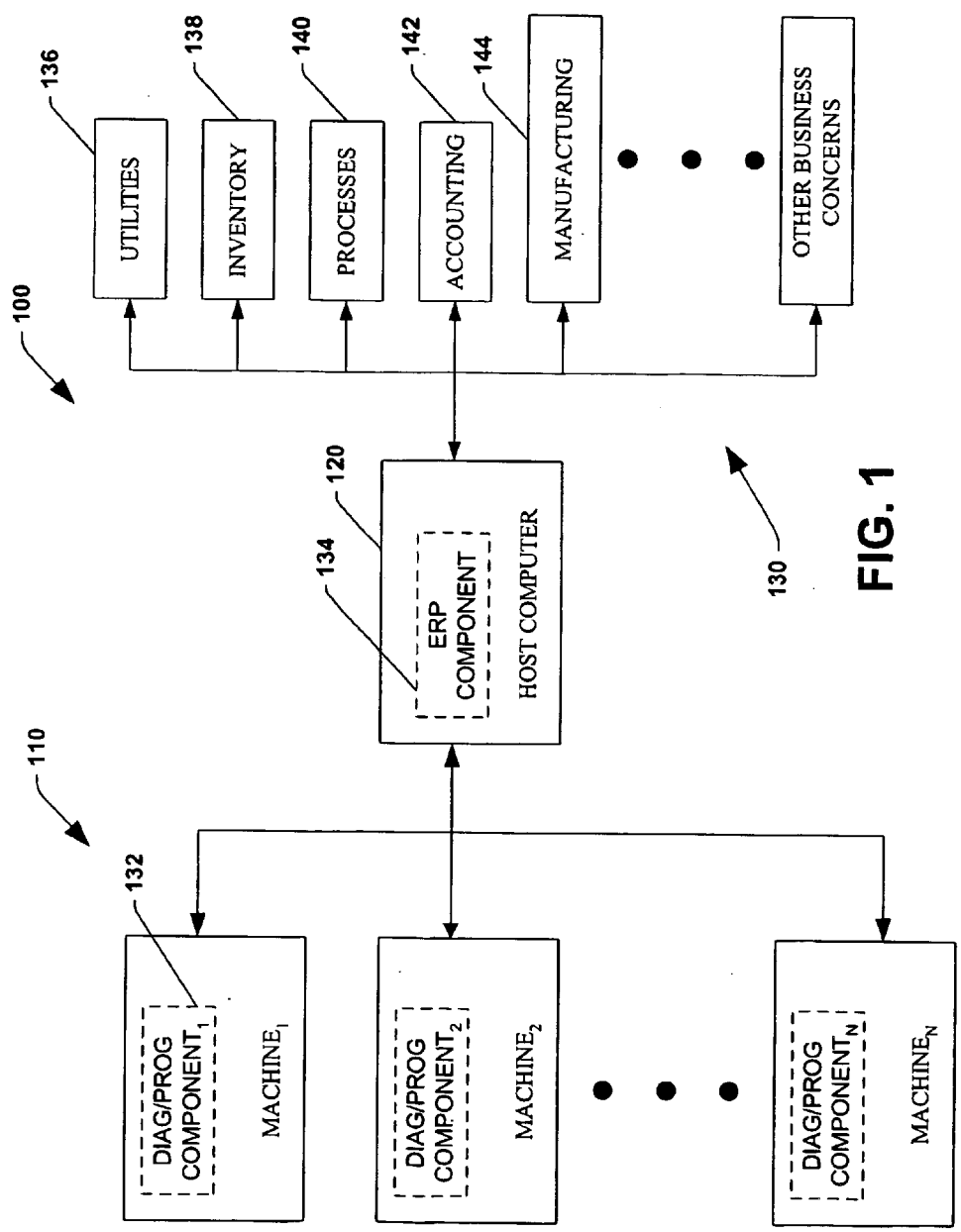
FIG. 1 is a high level illustration of a system in accordance with the subject invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The subject invention provides for system(s) and method (s) relating to employing machine data in connection with optimizing an overall system or process. The machine data can be collected dynamically (e.g., in the form of diagnostic data or control data) and/or generated in the form of prognostic data relating to future machine state(s). The machine data can be collected and/or generated in real-time (e.g., in situ, dynamically, without significant lag time from origination to collection/generation). The machine data can be analyzed and the analysis thereof employed in connection with optimizing machine utilization as well as other business components or systems (e.g., accounting, inventory, marketing, human resources, scheduling, purchasing, maintenance manufacturing . . . ) so as to facilitate optimizing an overall business objective or series of objectives or concerns.

The invention provides methods and systems for controlling a motorized system in order to achieve setpoint operation, as well as to optimize one or more performance characteristics associated with the system while operating within specified operating constraints. The invention is hereinafter illustrated with respect to one or more motorized pump systems and controls therefor. However, it will be appreciated that one or more aspects of the invention may be employed in operating other motorized systems, including but not limited to fans, conveyor systems, HVAC systems, compressors, gear boxes, motion control devices, screw pumps, mixers, as well as hydraulic and pneumatic machines driven by motors. Further other non-motorized systems are included in the scope of this invention including but not limited to ovens, transportation systems, magnetic actuators, reaction vessels, pressurized systems, chemical processes, and other continuous processes.

In addition, the attached figures and corresponding description below illustrate the invention in association with optimizing system and/or component efficiency, although it will be recognized that other performance characteristics of a motorized system may be optimized individually or in combination, which performance characteristics may include, but are not limited to, life cycle cost, efficiency, life expectancy, safety, throughput, emissions, operational cost, MTBF, noise, vibration, energy usage, and the like. Furthermore, the aspects of the invention may be employed to provide for optimization at a higher system level, wherein a process comprises a plurality of motorized systems as part of an overall automation system such that one or more performance characteristics of the entire process are optimized globally. Moreover, as discussed herein aspects of the invention can be employed in connection with optimizing many higher level systems (e.g., business-based system). The higher-level system optimization may prescribe not operating at an optimum efficiency point with regard to energy utilization. Rather, a more important, over-arching objective such as maximizing revenue generation may supercede more narrow, limited scope objectives of achieving lowest energy usage or extending machinery lifetime. The subject invention employs a performance driven approach to leverage off developments in diagnostic and prognostic algorithms, smart machines and components, new sensor technologies, smart sensors, and integrate these technologies among others in a framework of an enterprise-wide asset management (EAM) system. The combination of optimizing methods and processes in the framework of an EAM system comprise an Asset Optimization System.

In addition to maintenance and repair costs, consideration for issues such as operational impact, business strategy, and supply chain (e.g., connected supplier-manufacturer-customer) issues are also considered. There are several compelling business drivers that often make cost-effective machinery reliability not only economically sound, but also a business imperative. These recent business drivers include greater concern for protecting the environment, ultimate concern for worker safety, connected (e.g. virtual) organizations, make-to-order operating strategy, pay-for-performance (e.g. power-by-the-hour), containing warranty costs, and competitive time-based performance with greater scrutiny and expectations in a rapidly expanding e-business world.

Although, the subject invention is primarily described in connection with motors and pumps, it is emphasized that the subject invention applies directly to other commercial and industrial process machinery/systems. These systems could include for example a plant HVAC system, a conveyor system, a semi-conductor fab line, chemical processing (e.g. etching processes) or other continuous process or non-motor driven machinery. Providing overall asset optimization as proposed herein can require integrating and optimizing other non-motor components in a plant. The scope of the subject invention as defined by the hereto appended claims is intended to include all such embodiments and applications.

FIG. 1 is a high-level diagram illustrating one particular system 100 in connection with the subject invention. The system 100 includes a plurality of machines 110 (MACHINE$_1$ through MACHINE$_N$—N being an integer) at least a subset of which are operatively coupled in a manner so as to share data between each other as well as with a host computer 120 and a plurality of business components 130. The machines 110 include a respective diagnostic/prognostic component 132 that provides for collecting and/or generating data relating to historical, current and predicted operating state(s) of the machines. It is to be appreciated that the plurality of machines can share information and cooperate; and is it to be appreciated that the machines do not have to be the same. Furthermore, some of the machines 110 may comprise sub-systems or lower-level components that can have separate sensors, lifetime estimates, etc. For example a compressor may consist of a motor, pump, pressure chamber, and valves. The motor component may include smart bearings with embedded sensors to predict bearing lifetime.

The predicted operating state(s) of the machine may be determined based on expected demand or workload or a probabalistic estimate of future workload or demand. Similarly, expected environment (e.g. temperature, pressure, vibration, . . . ) information and possible expected damage information may be considered in establishing the predicted future state of the system. Undesirable future states of the system may be avoided or deferred through a suitable change in the control while achieving required operating objectives and optimizing established operational and business objectives. Moreover, it is to be appreciated that data relating to subsets of the machines can be aggregated so as to provide for data relating to clusters of machines—the cluster data can provide for additional insight into overall system performance and optimization. The clusters may represent sub-systems or logical groupings of machines or functions. This grouping may be optimized as a collection of process entities. Clusters may be dynamically changed based on changing operating requirements, machinery conditions, or business objectives. The host computer 120 includes an enterprise resource planning (ERP) component 134 that facilitates analyzing the machine data as well as data relating to the business concern components 130 (utilities component 136, inventor component 138, processes component 140, accounting component 142, manufacturing component 144 . . . ). The data is analyzed and the host computer 120 executes various optimization programs to identify configurations of the various components so as to converge more closely to a desired business objective. For example, assume a current business objective is to operate in a just in time (JIT) manner and reduce costs as well as satisfy customer demand. If the inventory component 138 indicates that finished goods inventory levels are above a desired level, the ERP component 134 might determine based on data from the utility component 136 and machine components 110 that it is more optimal given the current business objective to run the machines at 60% rather than 90% which would result in machinery prognostics indicating we may extend the next scheduled maintenance down time for another 4 months reducing the maintenance labor and repair parts costs. This will also result in reducing excess inventory over a prescribed period of time as well as result in an overall savings associated with less power consumption as well as increasing life expectancy of the machines as a result of operating the machines as a reduced working rate.

It is to be appreciated that optimization criteria for machinery operation can be incorporated into up-front equipment selection and configuration activities—this can provide additional degrees of freedom for operational control and enhanced opportunities for real-time optimization.

Maintenance, repair, and overhaul (MRO) activities are generally performed separate from control activities. Interaction and collaboration between these functions are typically limited to the areas of operations scheduling and to a lesser extent in equipment procurement—both are concerned with maximizing production throughput of the process machinery. Information from MRO systems and from machinery control and production systems are related and can provide useful information to enhance the production throughput of process equipment. The subject invention leverages off opportunities realized by closely coupling machinery health (e.g. diagnostics) and anticipated health (e.g. prognostics) information with real-time automatic control. In particular, the closed-loop performance of a system under feedback control provides an indication of the responsiveness, and indirectly, the health of the process equipment and process operation. More importantly, it is possible to change how the system is controlled, within certain limits, to alter the rate of machinery degradation or stress. Using real-time diagnostic and prognostic information the subject invention can be employed in connection with altering future state(s) of the machinery. Given a current operating state for both the machinery and the process the subject invention can drive the machine(s) 110 to achieve a prescribed operating state at a certain time in the future. This future operating state can be specified to be an improved state than would occur if one did not alter the control based on machinery health information. Furthermore, the future state achieved could be optimal in some manner such as machinery operating cost, machinery lifetime, or mean time before failure for example. The prescribed operating state of a particular machine may be sub-optimal however, as part of the overall system 100, the system-wide operating state may be optimal with regard to energy cost, revenue generation, or asset utilization.

For example, with reference to Table I below:

TABLE I

| Power Source/Control Technique | Direct Line Power—Flow Control with Throttle Valve | Drive Power—Flow Control via Motor Speed |
| --- | --- | --- |
| Full Flow—Power Flow: 75 gpm (flow not restricted) | 1.07 kW | 1.13 kW |
| Reduced Flow—Power Flow: 45 gpm (restricted flow) | .881 kW | .413 kW |

The above data exhibits energy utilization from a motor-pump system under conditions of full flow and reduced flow. The flow rate conditions shown are achieved using a variable speed drive to control motor speed and therefore flow rate (column 1) and with a motor running directly from the power line with a throttling valve used to control flow rate (column 2). The estimated energy savings with Drive Power at reduced flow is 0.468 kW—a 53% energy savings in connection with Drive Power. Pumping applications which require operation at various prescribed head Pressures, liquid levels, flow rates, or torque/speed values may be effectively controlled with a variable speed motor drive. The benefits of using a variable speed motor controller for pump applications are well established, particularly for pumps that do not operate at full rated flow all the time. In fact, the variable speed drive used for testing in connection with the data of Table I has a user-selectable factory setting optimized for fan and pump applications although these optimized settings were not employed for the energy savings reported herein. The scope of benefits beyond energy savings include improved machinery reliability, reduced component wear, and the potential elimination of various pipe-mounted components such as diverters and valves and inherent machinery protection such from over-current or under-current operation. Pumps which typically operate at or near full synchronous speed and at constant speed will not realize the energy savings as we have demonstrated in Table I. Process conditions that require pump operation at different flow rates or pressures (or are permitted to vary operation within process constraints) are candidates to realize substantial energy savings as we have shown. If maximum throughput is only needed infrequently, it may be beneficial to specify the hydraulic system and associated control to optimize performance over the complete span of operating modes based on the time spent in each mode. It will be necessary in this case to specify the duration of time the hydraulic system is operating at various rating levels coupled with the throughput and operating cost at each level.

Although machine control is discussed herein primarily with respect to motor speed, the invention is not to be construed to have control limited to such. Rather, there are other control changes that can be made such as for example changing controller gains, changing carrier frequency in the case of a VFD motor controller, setting current limits on acceleration, etc. The control can be broad in scope and encompass many simultaneous parameter changes beyond just speed. Moreover, the use of models can be a significant component of control and configuration optimization. A space of possible operating conditions for selection that optimizes a given process or business performance may be determined by employing a simulation model for example. Modeling techniques can also serve as a basis for prognostics—thus, a simulation model can encompass process machinery, throughput, energy costs, and business and other economic conditions.

With respect to asset management, it is to be appreciated that the system 100 may determine for example that purchasing several smaller machines as compared to a single large machine may be more optimal given a particular set of business objectives.

It is also to be appreciated that the various machines 110 or business components 130 or a subset thereof can be located remotely from one another. The various machines 110 and/or components 130 can communicate via wireless or wired networks (e.g., Internet). Moreover, the subject invention can be abstracted to include a plant or series of plants with wireless or wired networked equipment that are linked via long distance communications lines or satellites to remote diagnostic centers and to remote e-commerce, distribution, and shipping locations for dynamic logistics integrated with plant floor prognostics and control. Thus, optimization and/or asset management in connection with the subject invention can be conducted at an enterprise level wherein various business entities as a whole can be sub-components of a larger entity. The subject invention affords for implementation across numerous levels of hierarchies (e.g., individual machine, cluster of machines, process, overall business unit, overall division, parent company, consortiums . . . ).

Figure 2:
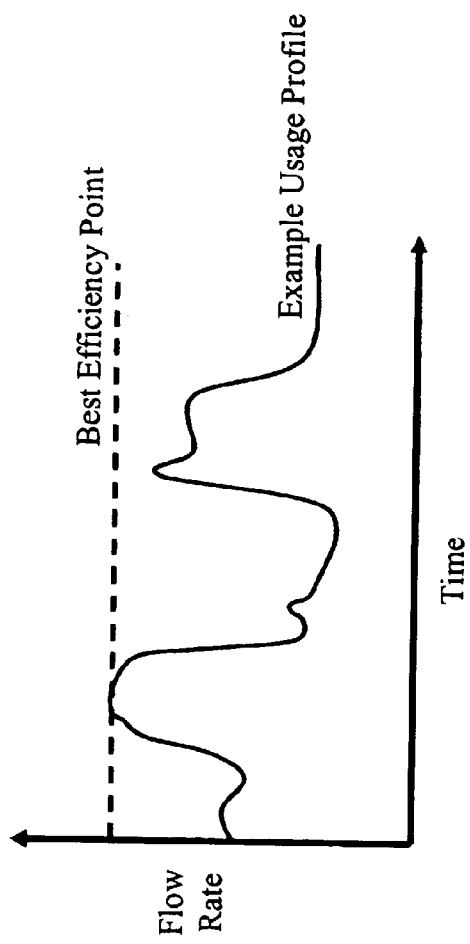
FIG. 2 illustrates exemplary operating levels of a pump system over time in accordance with the subject invention.

FIG. 2 illustrates operating levels over time of an exemplary pump system. The few, rare excursions at maximum flow result in hydraulic losses and energy losses during most of the operating time at lower flow rates. Integrating the losses under a peak efficiency curve provides an estimate of aggregate losses (and saving opportunity) for a target pump applications. Aggregate pump level usage information is represented in a very concise manner by Frenning, et al. (2001) in a duration diagram. This diagram shows the number of hours per year needed at various flow rates are needed and provides a means to evaluate potential performance and energy benefits through up-front system design and control specification. Beyond these established benefits, there are important novel benefits associated with integrating diagnostics and prognostics information with established automatic motor control methods as discussed herein.

It is to be appreciated that the subject invention employs highly sophisticated diagnostic and prognostic data gathering, generation and analysis techniques, and such should not be confused with trivial techniques such as automatic disconnect based on an excessively high current or temperature to be integrated diagnostics (e.g., something is wrong) and control (e.g., automatic contact closure). For the purpose of establishing an intelligent system for pump applications as described above, we do not consider such machinery protection with bang-bang, on-off control to be integrated diagnostics and control. Diagnostic information as employed by the subject invention can be information regarding a condition of system components or operating conditions that will accelerate wear and hasten failure of critical system elements. For example, information which identifies a level of degradation of a bearing element, the degree of insulation capability lost, the amount of time motor windings were operated at elevated temperature or that cavitation is occurring is useful diagnostic information. Such information can be combined to automatically alter prescribed control action, within allowable limits, to maintain useful operation and potentially reduce stress and degradation rate(s) of weakened components. The ultimate effect is to defer, under controlled conditions, eventual machinery failure.

Feedback control for pumping applications will often have one or more process variables such as flow rate, head pressure, or liquid level sensed by a transducer and converted to a digital signal. This digitized signal is then input to a control computer where the sensed digitized value is compared with the desired, setpoint value as discussed in greater detail infra. Any discrepancy between the sampled value and the setpoint value will result in a change in the control action to the motor-pump system. The change to the motor-pump system may be a new commanded valve position for a motor-operated valve or a new commanded setpoint speed for a variable speed motor application.

Feedback control systems as described above are termed error-nulling processes. We may represent the feedback controlled pumping system as a lumped parameter linear system. The most general state space representation of a linear, continuous time dynamical system can be provided as:

$$\dot{x} = A(t)x(t) + B(t)u(t) \quad y(t) = C(t)x(t) + D(t)u(t) \tag{1}$$

Here x(t) is the state vector representation of the system, u(t) is the vector of real-valued inputs or control variables, and y(t) is the vector of system real-valued outputs. Matrices A, B, C, and D represent the plant or process state transitions, control input transition, state output process, and direct input-output (e.g. disturbances) process respectively. It is possible to incorporate diagnostic information into this controller by altering the controller based on assessed equipment health. For example, if the diagnostic analysis indicates that motor windings are beginning to heat up we may alter the controller to reduce the gain used to determine system input changes. This will result in a system with less stress on the motor windings but at the expense of slightly less system response. We may employ other techniques to shift losses from weakened components to stronger system elements. If it is determined through vibration analysis or current signature analysis techniques that operation is at a critical or resonant frequency, we may alter system speed to avoid such critical frequencies that may accelerate wear of bearing components.

As another example, if we detect that cavitation is occurring in the pump based on computed pump parameters and pump curves, we may reduce motor speed to eliminate the degrading cavitation condition. In particular, we may reduce speed to the point that adequate net positive suction head available (NPSHA) is equal to the net positive suction head required (NPSHR). As operating conditions changes and NPSHA increases, then motor speed may be automatically increased to the point that maximum flow is one again achieved while NPSHR <=NPSHA. A more detailed example of an integrated diagnostic system with compensating control is described below in the case study.

It is significant to note that in the absence of downstream transducers for pressure and speed, the existence of many pumping problems can be determined using only sampled motor current. For example, with pumping systems, motor speed can be determined from motor current. The existence of cavitation can be determined from a single phase of motor current during pump operation. Such observation is significant since pump curves are not required to perform this diagnosis and the results are potentially more accurate since what is being sensed is a specific feature indicative of cavitation rather than utilizing pressure, flow, and pump nominal curves. Changes in viscosity, chemical composition, and pump geometry such as from wear, will alter the accuracy of the pump curves. MCSA techniques promise to be more accurate and less invasive than more traditional pressure-flow measurements with pump nominal design information.

Through various diagnostic means such as described above it is possible to determine that an undesirable operating state is occurring or that certain degraded components will result in early machinery failure. Important benefits are possible by automatically altering the control to avoid the higher-stress operating and control modes or to avoid stressing weakened or degraded components and thereby extend the useful operating life of machinery.

Prognostics & Control

Although process optimization has been employed for many years (e.g. dynamic optimization) such as for continuous chemical processing applications, unique and important benefits are possible by utilizing machinery diagnostics and prognostic information to prescribe an optimum control action dynamically. The benefits of integrated diagnostics and control may be significantly expanded by utilizing information describing the rate of degradation and remaining useful life of machinery under various possible operating conditions. This permits changing the operating mode to achieve a designated operating lifetime. Alternatively, the control can be specified to minimize energy consumption and maintenance costs or to maximize revenue generation. In extreme conditions, the control may specified to achieve performance beyond the normal operating envelope to protect the environment, avoid costly losses, or protect worker safety while insuring that failure will not occur during these extreme operating conditions. Prognostics with control provides the foundation for overall process optimization with regard to objectives such as efficiency, business strategies, maintenance costs, or financial performance.

Implementing variable speed motor control for pumping applications can provide direct savings in reduced energy consumption as described herein. Additional benefits are possible by treating drive-motor-pump-hydraulics as an integrated system. Combining individual efficiency curves of a motor, pump, and drive permits generating a composite system performance profile. This aggregate system model can be used to diagnose the system as an integrated collection of coupled elements and to prescribe a preferred operating state of the system.

In connection with the subject invention it is proposed to extend the control model for the variable speed motor controller by incorporating three additional elements in the control model.

The three elements that augment the control model are:

Specification of the allowable range of operation

Diagnostic & prognostic information, and

Specification of optimal system operation, processing objectives and business objectives The first element in the control model is the capability to permit operation within a range of process (state) variables. For example, although a desired (e.g., setpoint) flow may be 100 gpm, however the system may effectively run anywhere between 60 gpm and 110 gpm. The specification of the allowable range of operation may include data related to the sensitivity, accuracy, or marginal nature of the operating bound. Probabilistic and time-dependency information may also be included in the boundary specification.

The second element in the extended control model is information relating to the health of the process machinery and its operation along with information on the future health of the machinery such as rate of degradation and remaining useful life. For example, one may determine that the elevated temperature rise in the motor windings will reduce insulation life by ½ or that the detected level of cavitation will accelerate seal failure by 10 fold.

The third element in the extended control model is an analytic representation of the operating objectives of the process or plant along with any additional operating constraints. The representation of the operating objectives of the process provides a quantifiable measure of the "goodness of operation" and may include critical performance criteria such as energy cost and process revenues. This permits establishing an objective function that may subsequently be optimized through suitable control changes. Additional operating constraints may include data such as noise level, maximum process completion time. An objective function specifying the process and business benefits may be optimized via dynamic changes in the control action subject to not violating any of the process operating constraints.

We can utilize established life expectancy models in conjunction with classical control techniques to control the residual lifetime of machinery. For example, crack growth models based on cyclic loading provide a probabilistic model that can be embedded in a simulation model to determine future stress due to vibration, temperature gradient, and pressure. The Forman deterministic crack growth failure model provides a basis for altering the stress and rate of crack growth directly from changes in the control. The altered control then provides a quantitative measure of the change in crack growth rate. This information can be used to control the expected remaining lifetime of degraded components and insure that failure does not occur before a tank is emptied or a scheduled PM or machinery overhaul occurs.

The subject invention's focus of prognostics and distributed control will enable future plant operations to be based on proactive operation rather than reactive problem solving. Device alerts from remote intelligent devices can warn of future potential problems giving time for appropriate remedial or preventive action. Embedding operational objectives and plant performance metrics into an automated decision-making system can permit a high degree machinery reliability avoid the unexpected process failures that impact quality and reduce yields. Integrating prognostic information with automatic, real-time decision making provides a basis for dynamic optimization and provides unique, important benefits due to optimized plant operation.

Dynamic Optimization

Given that permissible operating modes have been suitably defined, and established a means to project into the future possible or probable operating states, and a criterion for judging preferred or optimal performance the problem can be formulated as a classical optimal control problem.

For example, if the operating objective is to minimize energy cost per gallon pumped then the objective function will include flow information, cost per kWh, and motor-drive power consumed. Dynamic changes can be made to both the motor speed and drive internal parameters to optimize the cost per gallon pumped subject to previously defined process constraints. It is significant to note that the operating example above will result in the least energy cost per gallon pumped; however, it may also result in accelerated wear or thermal degradation of critical machinery components. A more comprehensive operational model and objective function may incorporate these additional parameters if required. Additional parameters may include information such as expected failure rate and failure cost for different operating modes, machinery lifetime and capital replacement costs, and the impact on other connected machines and processes such as valves, piping, and other process machines.

One exemplary aspect of the subject invention establishes a control method that will support decision making at each decision time interval or control iteration loop. One principle of dynamic programming specifies that if the system is at some intermediate point on an optimal path to a goal then the remainder of the path must be on an optimal path from the intermediate point to the goal. This permits making optimum choices of the control variable, u(t), at time t that by only considering the need to drive the system from state x(t) to x($t_f$), the final state of the system. This approach provides an efficient technique for sequential decision making while insuring that the complete system trajectory will be optimum from time t0 to $t_f$ and we do not need to consider all possible control options at every decision point simultaneously.

The optimization problem can be formulated as:

$$\text{Min} J = S\left(x(t_f), t_{f_1}\right) + \int_{to}^{tf} L(x(t), u(t), t) dt \qquad (2)$$

Subject to $f(x(t), \dot{x}(t), y(t), u(t))=0$ where $t \in [t_0, t_f]$ with defined initial conditions, time constraints, control variable and state variable constraints. Here J represents an objective function value to be minimized (or maximized). S and L are real-valued functions with S representing cost penalty due to the stopping error at time $t_f$ (e.g. wasted fluid not pumped or discarded useful life in replaced equipment). L represents the cost or loss due to transient errors in the process and the cost of the control effort during system operation.

For example, if the value of the stopping cost function is set at S=0 and L=u$^t$u then:

$$\text{Min}J = \int_{t_o}^{t_f} u^t u \, dt \quad (3)$$

Equation 3 is a measure of the control effort or energy expended for a process operating from time to $t_0$ time $t_f$. This is termed the least-effort problem and in the case of a drive-motor-pumping system, results in completing a process segment (e.g. emptying a tank) at the lowest possible energy cost.

When J is differentiable, gradient search techniques can be employed to compute the desired change in control, u(t), that moves J closer to the minimum (or maximum value). The concept of the gradient is significant in that the change in the objective function we obtain from a suitable control u(t) is proportional to the gradient, grad(J). This provides a specification for the change in u needed to move J closer to the optimum. If J is convex then local optimum values are not much of concern and any optimum value obtained is a global optimum. This formulation permits a step-by-step evaluation of the gradient of J and the selection of a new control action to drive the system closer to an optimum.

Figure 3:
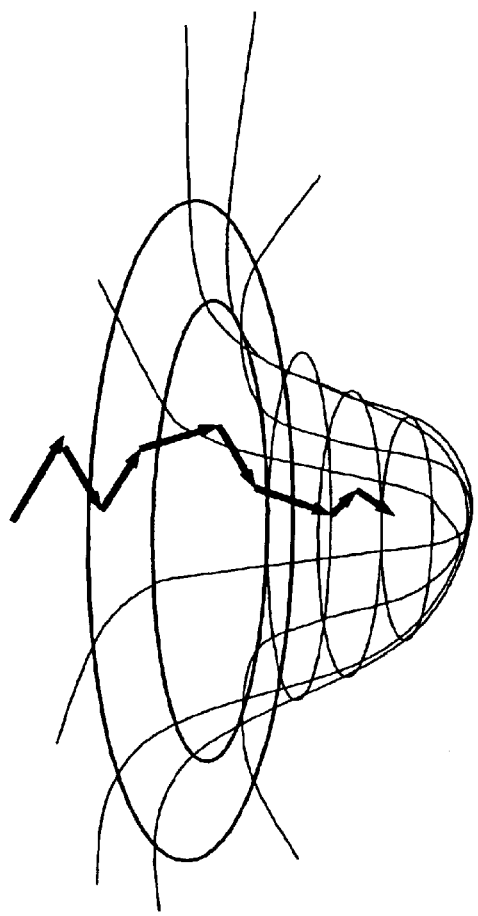
FIG. 3 graphically illustrates a gradient search technique in accordance with the subject invention.

The gradient search technique, also called the method of steepest decent is illustrated graphically in FIG. 3. Here each arrow represents a new control decision in the quest to realize a minimum value for the objective function, J. The specification of the optimal performance metric, J, can incorporate information beyond energy utilization, maintenance cost, or longevity of operation. For example, it is possible to also formulate J to include strategic business information and asset value information. In this manner selecting the sequence of optimal control actions u(t) to optimize J will drive the system to achieve optimum utilization of the assets involved.

Asset Optimization

The specification of the optimum operation of plant equipment described above provides a flexible platform to incorporate various business and operational factors. It is possible to include the cost of maintenance for various failure modes, replacement and installation costs, maintenance strategies, cost for scrap, re-work, line-restarting, and revenue generation from the specified machinery. This permits the generation and implementation of optimal asset lifetime management policies across critical plant assets. The operational success of this approach requires an effective Asset Register base, observability of key state variables, and viable process and component models. The utilization of open, industry standards for asset registry provides important capabilities for integrating operating information across a manufacturing plant and even across facilities. More recent developments have resulted in an Open Systems Architecture for Condition-Based Maintenance that provides a framework for real-time integration of machinery health and prognostic information with decision support activities. This framework spans the range from sensors input to decision support—it is open to the public and may be implemented in a DCOM, CORBA, or HTTP/XML environment.

Often complex business and operational decisions are difficult to incorporate into a single, closed-form objective function. In this case, operating decision and control objectives may be decomposed into a suite of sub-problems such that when taken together, the overall, more complex problem is solved. For example, a process can be decomposed into a pumping process, chemical reaction, and storage/batch transport problem. These decompositions can be treated as individual sub-problems and optimize each of these subject to boundary or interaction constraints between each sub-problem. Alternatively, the decomposed problem can be treated as a collection of coupled decision and seek an optimum that balances possibly conflicting objectives and establishes a compromise decision or control which is in some sense optimally global. For example, an industry-wide drive to improve capital equipment utilization and enhance RONA values may be in conflict with reducing maintenance costs and maximizing revenue generation per energy unit consumed. Established techniques for solving coupled and un-coupled optimization can be employed to facilitate overall asset optimization. The compatibility of control strategies with maintenance and scheduling strategies provides new opportunities to optimize assets utilization. Automation control actions may automatically initiated which reinforce and drive toward strategic business objectives established by management. In accordance with another particular example, an asset optimization system can continually monitor energy costs via the Internet and dynamically change machinery operation based on new energy costs to maximize revenue generation. If energy costs become substantially high then the criteria for energy-efficient operation can overtake the optimization criteria of maximizing production throughput.

Real Options Analysis as a New Economic Tool Linking CBM Investments to Business Strategy In connection with machine and business state prognostics, asset management and optimization in accordance with the subject invention, it is to be appreciated that preventing unexpected equipment failures can provide important operational and economic benefits. Using real options pricing to provide a more accurate value of deferring machinery repair or altering the control strategy. One aspect of the subject invention provides for automatically checking the availability, cost, and performance specifications of new components to replace healthy component. Swapping out old, less efficient components with new, more efficient components permits further optimizing process operation and optimizing overall asset utilization.

The asset optimization program in connection with the subject invention for example could launch a crawler or spider to search for potential replacement components across the Internet. The asset optimization system can for example continually monitor energy costs via the Internet and dynamically change machinery operation based on new energy costs to maximize revenue generation. If energy costs become high enough then the criteria for energy-efficient operation will overtake the optimization criteria of maximizing production throughput. Machinery failure prevention can be enhanced by implementing a condition-based maintenance (CBM) system with on-line, continuous monitoring of critical machinery. An economic analysis required to justify CBM acquisitions often follows a model used to evaluate other plant acquisitions. However, traditional machinery acquisition valuation methods do not adequately capture the operational and strategic benefits provided by CBM systems.

A financial model derived from options in financial markets (e.g. puts and calls on shares or currencies) is proposed to facilitate capturing unique and important benefits of CBM systems. In particular, a CBM system inherently provides future decision and investment options enabling plant personnel to avoid a future failure by making these subsequent investments (exercising the option). Future options enabled by an initial CBM investment provide economic benefits that are difficult to capture with traditional capital asset pricing models. Real options valuation methods are designed to capture the benefits of future investment and strategic options such as those enabled by a CBM system. Augmenting existing economic analysis methods with an option value pricing model can capture, in financial terms, the unique and important business benefits provided by CBM investments.

New developments in condition based monitoring algorithms, sensors, communications, and architectures promise to provide new opportunities for diagnostics and prognostics. CBM systems often require an incremental investment beyond what is needed for basic manufacturing and automation equipment. The acquisition of condition-based maintenance systems and components must compete with other acquisition requests to obtain capital from a limited pool of available funds. The costs associated with implementing a CBM system are often easy to obtain although they may have many components such as development, purchase, installation, support, and calibration. However, it has traditionally been difficult to accurately capture the benefits associated with a CBM investment. Augmenting existing investment analysis methods with real option valuation methods may provide a more accurate economic picture of the benefits from a CBM investment opportunity. Investment decisions are typically based on a traditional economic analysis of the funding opportunities available. Traditional funding models such the capital asset pricing model (CAPM) make assumptions regarding the investment required over time and the expected financial return over time. These cash flows are brought back to a net present value (NPV) level using an accepted discounting method and rate. The discount rate is chosen to account for the cost of capital and the inherent risk in the project. The investment analysis typically provides a basis for a go/no-go decision on resource allocation. Once approved, the funded project proceeds with cash flow proceeding as prescribed in the project plan. In this respect, many plant acquisition projects may be considered passive.

A significant and unique characteristic of a CBM investment is the subsequent operational and investment options it provides management. A CBM system does not inherently prevent a failure or automatically reduce maintenance costs. A CBM system provides the essential information that permits avoiding a failure or for minimizing maintenance or repair costs. Realizing the benefits enabled by a CBM system requires active decision making to initiate the indicated repair, operating changes, or acquisitions. Similar to financial investment models such as put and call, a CBM investment does not prevent a failure or automatically generate profit, it affords an option to take action sometime in the future (exercise an option) to realize a financial or operational benefit. The option to make future decisions may be captured in an economic model derived from financial investment futures. This technique, called real options valuation, is directed at establishing an economic value of an investment that includes the benefits (and costs) derived from potential future investments. The potential future investment options are enabled by the initial investment and they may be deferred, exercised, or canceled at some time in the future when more information in known. In this sense, real options valuation takes into account the dynamic and active role of management over the life of the investment.

The subject invention can augment the traditional economic valuation methods used for plant acquisitions with results from a real options valuation to establish the value of a CBM investment. Condition based maintenance systems provide information essential for establishing effective reliability centered maintenance programs. Information regarding the degree of machinery degradation, a diagnosis of an early stage fault, and prognostics information such as remaining useful life enable plant maintenance and operations personnel to take action to minimize maintenance expenses and operations impact. A real options approach to evaluating investments in machinery monitoring and diagnostic systems may provide insight into the future value associate with subsequent linked investment options. Investment in an initial CBM system for example can provide future, more informed options to further expand the core CBM system or to integrate the system into other business information systems. Alternatively, information from the initial CBM system can enable other operational investments that otherwise would not be available. For example, a CBM system may provide a basis for accelerating periodic maintenance, or may prescribe replacing equipment just before failure and minimizing the amount of remaining useful life that is discarded. Information from the CBM system may also provide valuable information on when to exercise the upgrade or replacement option.

The aforementioned examples and discussion are simply to convey the numerous advantages associated with the subject invention. It is to be appreciated that any suitable number of components and combination thereof can be employed in connection with optimizing the overall system 100 in accordance with the present invention. Moreover, as a result of the large number of combinations of components available in connection with the subject invention some of the combinations will have known correlations while there may exists other correlations not readily apparent but yet still have an influence in connection with optimization of the system 100. Accordingly, in connection with one particular aspect of the invention data fusion can be employed in situations in order to take advantage of information fission which may be inherent to a process (e.g., vibration in the machine 110) relating to sensing a physical environment through several different sensor modalities. In particular, one or more available sensing elements may provide a unique window into the physical environment where the phenomena to be observed is occurring (e.g., in the motorized system and/or in a system of which the motorized pumping system is a part). Because the complete details of the phenomena being studied (e.g., detecting the operating state of the system or components thereof) may not be contained within a single sensing element window, there is information fragmentation which results from this fission process. These information fragments associated with the various sensing devices may include both independent and dependent components.

The independent components may be used to further fill out (or span) the information space and the dependent components may be employed in combination to improve the quality of common information recognizing that all sensor data may be subject to error and/or noise. In this context, data fusion techniques employed in the ERP system 132 may include algorithmic processing of sensor data in order to compensate for the inherent fragmentation of information because a particular phenomena may not be observed directly using a single sensing element. Thus, data fusion provides a suitable framework to facilitate condensing, combining, evaluating and interpreting the available sensed information in the context of the particular application. It will further be appreciated that the data fusion may be employed in the diagnostics and prognostic component 132 in order to employ available sensors to infer or derive attribute information not directly measurable, or in the event of sensor failure.

Thus, the present invention provides a data fusion framework and algorithms to facilitate condensing, combining, evaluating and interpreting various sensed data. The present invention also facilitates establishing a health state of a system, as well as for predicting or anticipating a future state of the machine(s) 110 and/or the system 100 (e.g., and/or of a sub-system of which the motorized pump system 110 is a part). The data fusion system may be employed to derive system attribute information relating to any number of attributes according to measured attribute information (e.g., from the sensors) in accordance with the present invention. In this regard, the available attribute information may be employed by the data fusion system to derive attributes related to failed sensors, and/or to other performance characteristics of the machine(s) 110 and/or system 100 for which sensors are not available. Such attribute information derived via the data fusion may be employed in generating a diagnostics signal or data, and/or in performing control functions in connection therewith.

In another example, a measured attributes may comprise flow and pressure signals obtained from sensors associated with the machine 110 (e.g., pump), wherein the diagnostics system 132 provides a diagnostics signal indicative of pump cavitation according to measured flow and pressure signals. The invention thus provides for health indications relating to component conditions (e.g., wear, degradation, faults, failures, etc.), as well as those relating to process or systems conditions, such as cavitation in the pump 110. The diagnostics system 132 may comprise a classifier system, such as a neural network, detecting pump cavitation according to the measured flow and pressure signals, which may be provided as inputs to the neural network. The cavitation indication in the resulting diagnostics signal or data may further be employed to modify operation of the machine 110 and/or system 100, for example, in order to reduce and/or avoid such cavitation. Thus, an appropriate control signal may be provided by a controller to a motor drive in connection with the pump 110 in order to avoid anticipated cavitation, based on the diagnostics signal (e.g., and/or a setpoint), whereby the service lifetime of one or more system components (e.g., pump) may be extended.

In another related example, cavitation (e.g., actual or suspected) in the pump 110 may be detected via measured (e.g., or derived) current signal measurements, for example, via a sensor. The diagnostics system 132 in this instance may provide a diagnostics signal indicative of pump cavitation according to the measured current. In order to detect cavitation using such current information, the diagnostics system 132 may employ the neural network to synthesize a change in condition signal from the measured current. In addition, the diagnostics system 132 may further comprise a preprocessing portion (not shown) operatively coupled to the neural network, which conditions the measured current prior to inputting the current into the neural network, as well as a post processing portion operatively coupled to the neural network to determine whether the change in condition signal is due to a fault condition related to a motorized system driving the pump 110. In this regard, the post processing portion may comprise a fuzzy rule based expert system. In addition, the diagnostics system 132 may detect one or more faults relating to the operation of the pump 110 and/or one or more faults relating to the operation of a motor driving the pump 110 according to the measured current.

Other faults may be detected and diagnosed using the diagnostics and control system 132 of the invention. For instance, the diagnostics system 132 may be adapted to obtain a space vector angular fluctuation from a current signal (e.g., from a current sensor) relating to operation of the motor driving the pump, and further to analyze the space vector angular fluctuation in order to detect at least one fault in the motorized system. Such faults may include, for example, stator faults, rotor faults, and/or an imbalance condition in the power applied to the motor in the motorized system.

In this situation, the diagnostics/prognostic system 132 may obtain a current signal associated with the motor from the sensor, and calculate a space vector from the current signal. The diagnostics/prognostic system 132 determines a space vector angular fluctuation from the space vector, and analyzes the space vector angular fluctuation in order to detect one or more faults associated with the motor driving the pump 110. For instance, first, second, and third phase current signals associated with the motorized system may be sampled in order to obtain the current signal, and corresponding first, second, and third phase space vectors may be computed in the diagnostics/prognostic system 132.

A resulting space vector may then be calculated, for example, by summing the first, second, and third phase space vectors. The diagnostics/prognostic system 132 may then compare the space vector with a reference space vector, wherein the reference space vector is a function of a constant frequency and amplitude, and compute angular fluctuations in the space vector according to the comparison, in order to determine the space vector angular fluctuation. The diagnostics/prognostic system 132 then performs frequency spectrum analysis (e.g., using an FFT component) of the space vector angular-fluctuation to detect faults associated with the motorized system. For example, motor faults such as rotor faults, stator faults, and/or unbalanced supply power associated with the pump motor may be ascertained by analyzing the amplitude of a first spectral component of the frequency spectrum at a first frequency, wherein the diagnostics/prognostic system 132 may detect fluctuations in amplitude of the first spectral component in order to detect one or more faults or other adverse conditions associated with the motorized system. In this regard, certain frequencies may comprise fault related information, such as where the first frequency is approximately twice the frequency of power applied to the motor driving the pump. Alternative to generating a full spectrum, the diagnostics/prognostic system 132 may advantageously employ a Goertzel algorithm to extract the amplitude of the first spectral component in order to analyze the amplitude of the first spectral component. The diagnostics/prognostic signal indicating such motor faults may then be employed by a controller to modify operation of the pumping system 110 to reduce or mitigate such faults. The above discussion in connection with FIG. 1 was presented at a high-level—FIGS. 9 and 20 should be referenced in connection with details regarding the motor, drivers, sensors, controllers, etc.

Figure 4:
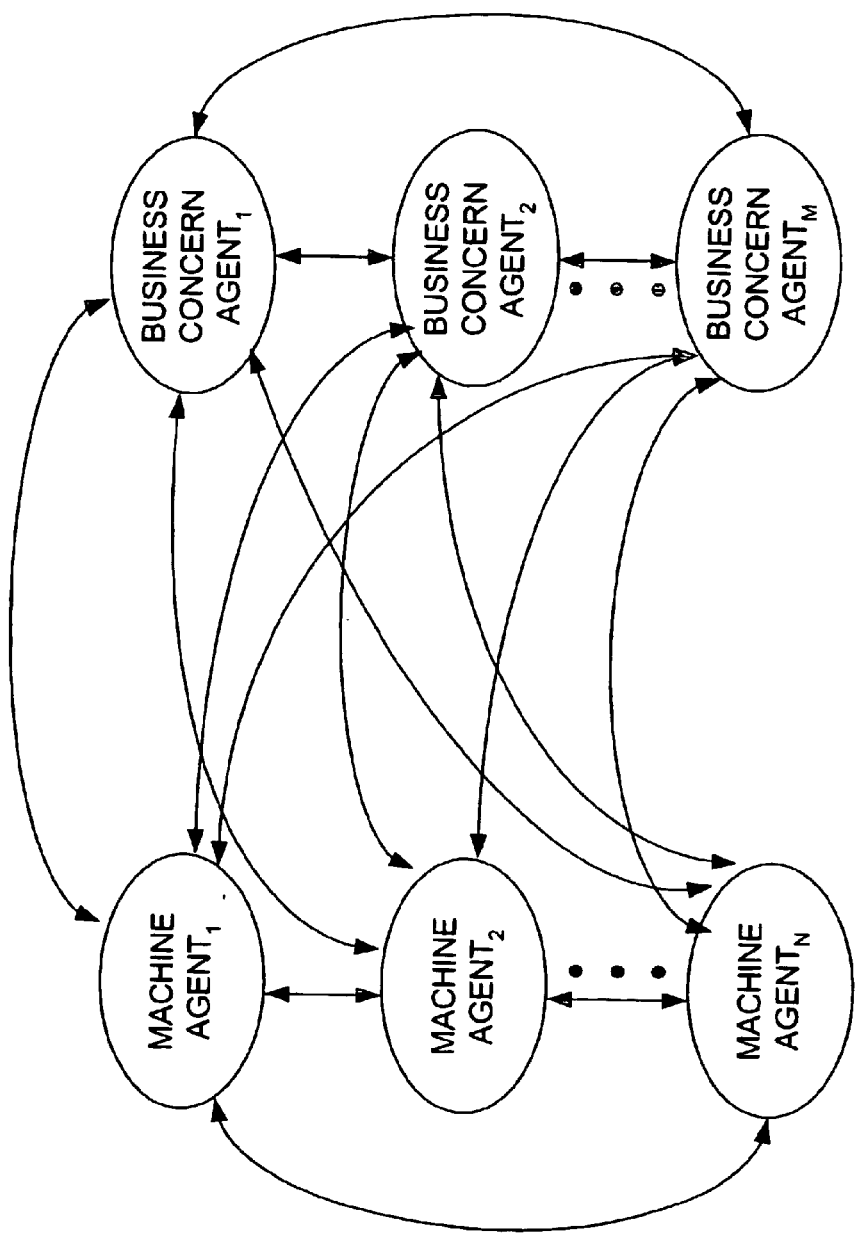
FIG. 4 illustrates an exemplary intelligent agent-based framework in accordance with the subject invention.

FIG. 4 illustrates an aspect of the subject invention wherein at least a subset of the machines or components are represented via intelligent software agents. For example, each of the respective machines 110 (FIG. 1) can be represented by respective intelligent agents (MACHINE AGENT$_1$ through MACHINE AGENT$_N$—N being an integer), and various business concerns represented by respective agents (e.g., BUSINESS AGENT$_1$ through BUSI- NESS AGENT$_M$—M being an integer). The intelligent agents can be software models representative of their various physical or software counterparts, and these agents can serve as proxies for their counterparts and facilitate execution of various aspects (e.g., machine or component interaction, modification, optimization) of the subject invention. The agents can be designed (e.g., appropriate hooks, interfaces, common platform, schema, translators, converters . . . ) so as to facilitate easy interaction with other agents. Accordingly, rather than executing an optimization algorithm for example on a respective device directly, such algorithms can be first executed on the respective agents and than once the system 100 decides on an appropriate set of modifications the final modifications are implemented at the agent counterparts with the agents carrying the instructions for such modifications.

The proliferation of distributed computing systems and enhanced prognostic, control, and optimization techniques provides via the subject invention for changing the landscape of industrial automation systems. The aforementioned framework complements technical capabilities for asset optimization via an agent based representation. Agents may be considered autonomous, intelligent devices with local objectives and local decision making. These agents however can be part of a larger collection of agents and possess social and collaborative decision making as well. These capabilities permit localized, distributed agents to collaborate and meet new, possibly unforseen operational conditions. In addition, through collaboration, some agents may choose to operate in a sub-optimal mode in order to achieve some higher level objective such as asset optimization, process safety, or overall process energy optimization.

Figure 5:
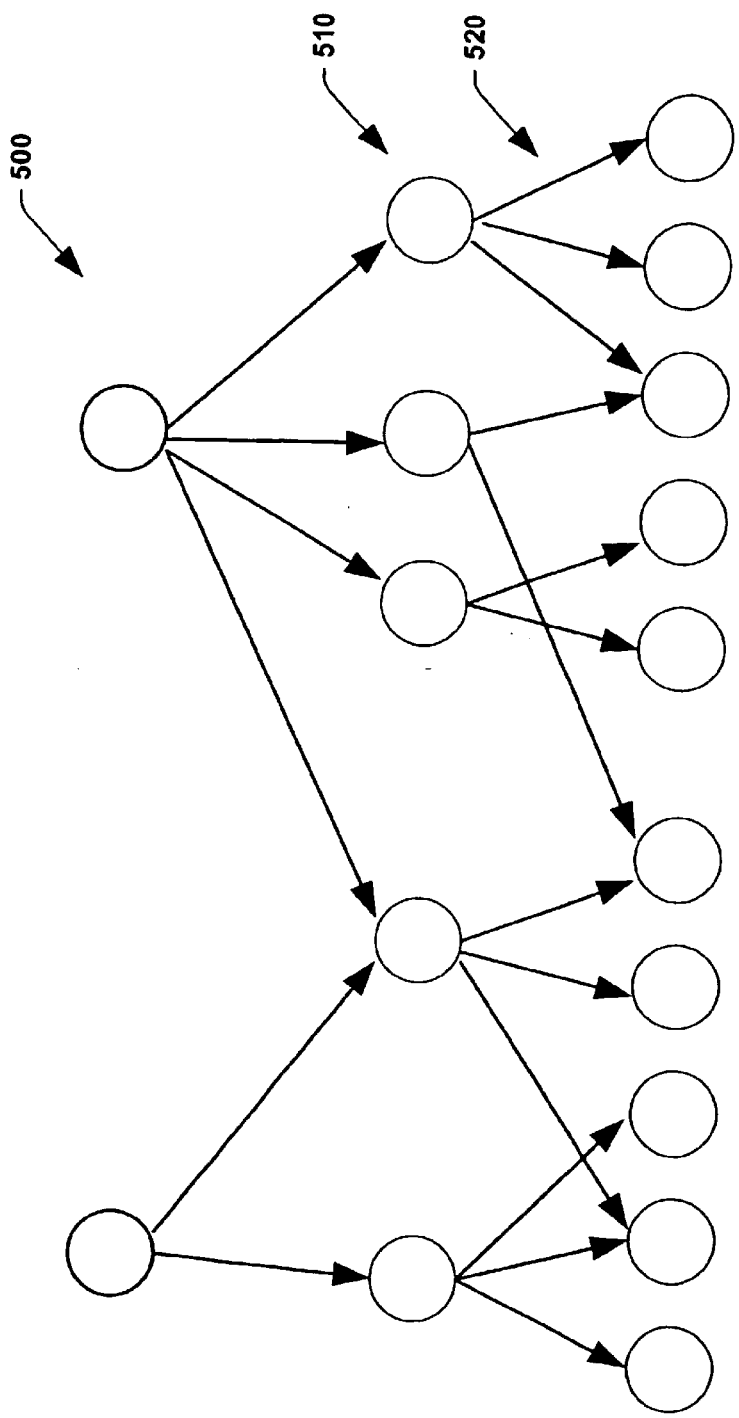
FIG. 5 illustrates an exemplary belief network in accordance with the subject invention.

FIG. 5 illustrates a representative belief network 500 that can be are used to model uncertainty in a domain in connection with the subject invention. The term "belief networks" as employed herein is intended to encompass a whole range of different but related techniques which deal with reasoning under uncertainty. Both quantitative (mainly using Bayesian probabilistic methods) and qualitative techniques are used. Influence diagrams are an extension to belief networks; they are used when working with decision making. Belief networks are employed to develop knowledge based applications in domains which are characterized by inherent uncertainty. A problem domain is modeled as a set of nodes 510 interconnected with arcs 520 to form a directed acyclic graph as shown in FIG. 5. Each node represents a random variable, or uncertain quantity, which can take two or more possible values. The arcs 520 signify the existence of direct influences between the linked variables, and the strength of each influence is quantified by a forward conditional probability.

Within the belief network the belief of each node (the node's conditional probability) is calculated based on observed evidence. Various methods have been developed for evaluating node beliefs and for performing probabilistic inference. The various schemes are essentially the same—they provide a mechanism to propagate uncertainty in the belief network, and a formalism to combine evidence to determine the belief in a node. Influence diagrams, which are an extension of belief networks, provide facilities for structuring the goals of the diagnosis and for ascertaining the value (the influence) that given information will have when determining a diagnosis. In influence diagrams, there are three types of node: chance nodes, which correspond to the nodes in Bayesian belief networks; utility nodes, which represent the utilities of decisions; and decision nodes, which represent decisions which can be taken to influence the state of the world. Influence diagrams are useful in real world applications where there is often a cost, both in terms of time and money, in obtaining information.

An expectation maximization (EM) algorithm is a common approach for learning in belief networks. In its standard form it does not calculate the full posterior probability distribution of the parameters, but rather focuses in on maximum a posteriori parameter values. The EM algorithm works by taking an iterative approach to inference learning. In the first step, called the E step, the EM algorithm performs inference in the belief network for each of the datum in the dataset. This allows the information from the data to be used, and various necessary statistics S to be calculated from the resulting posterior probabilities. Then in the M step, parameters are chosen to maximize the log posterior $logP(T|D,S)$ given these statistics are fixed. The result is a new set of parameters, with the statistics S which we collected are no longer accurate. Hence the E step must be repeated, then the M step and so on. At each stage the EM algorithm guarantees that the posterior probability must increase. Hence it eventually converges to a local maxima of the log posterior.

Figure 6:
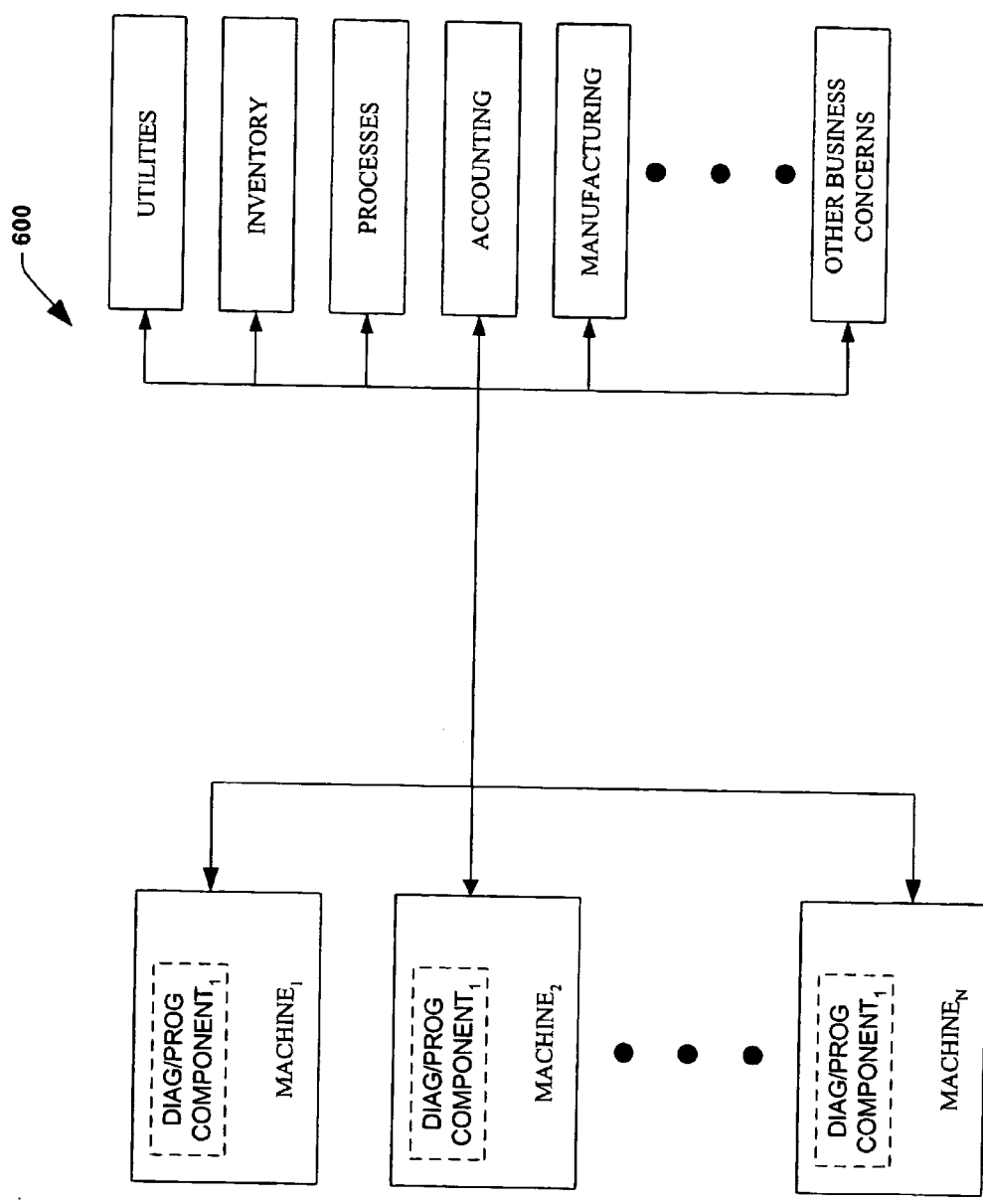
FIG. 6 is a high level illustration of a distributed system in accordance with the subject invention.

FIG. 6 illustrates an aspect of the invention in which the invention is employed as part of a distributed system 600 rather than via a host computer (FIG. 1). Thus, the various components in the system 600 share processing resources and work in unison and/or in subsets to optimize the overall system 600 in accordance with various business objectives. It is to be appreciated that such distributed system can employ intelligent agents (FIG. 2) as described supra as well as belief networks (FIG. 5) and the ERP components 132 (FIG. 1) and data fusion described above in connection with the system 100. Rather than some of these components (ERP, data fusion) being resident on a single dedicated machine or group of machines, they can be distributed among any suitable components within the system 600. Moreover, depending on which threads on being executed by particular processors and the priority thereof, the components may be executed by a most appropriate processor or set of processors given the state of all respective processors within the system 600.

Figure 7:
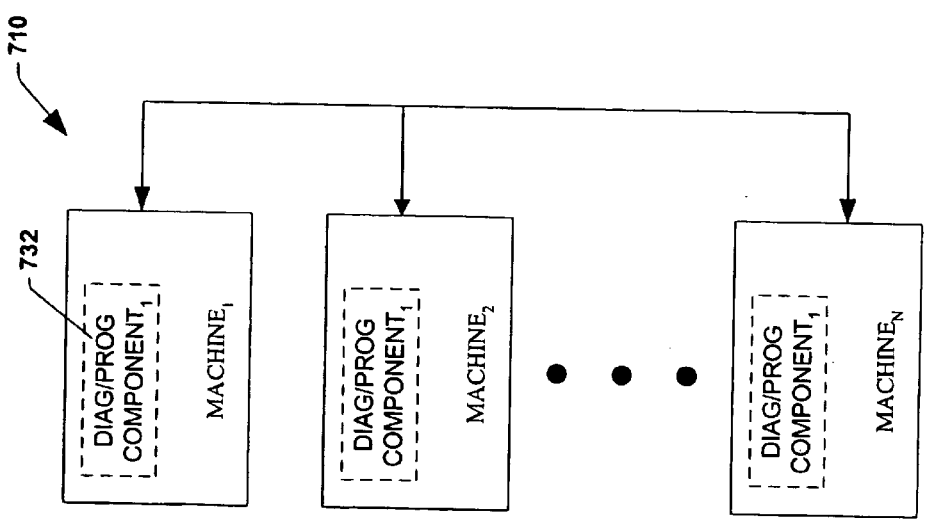
FIG. 7 illustrates a plurality of machines employing the subject invention in connection with optimization.

FIG. 7 illustrates another aspect of the subject invention wherein the invention is implemented among the respective machines 710 in connection with optimizing use thereof. For example, the diagnostic/prognostic components 732 can exchange and share data so as to schedule maintenance of a particular machine, or load balance . . . .

Retuning back to FIG. 1, the present invention can also be employed in connection with asset management. Typically diagnostics activities for many industrial and commercial organizations are conducted separate from control and process operation activities. In addition, the interface to acquire needed maintenance and repair components is often done manually. Similarly, captial acquisition of replacement equipment is also performed in a manual, batch, off-line manner. Equipment acquisition decisions are often made with a separate economic analysis including pricing analysis and consideration for capital funding available. It is difficult to incorporate dynamic operational data such as efficiency, reliability, and expected maintenance cost into this analysis. The growing presence of e-commerce and computer-accessible acquisition information is rarely utilized by computer systems. Instead, these e-commerce systems are often accessed by a human. The subject invention includes an optimization function that facilitate providing for facilitating realization of maximum revenue from an industrial machine while mitigating catastrophic failure. Machinery operation can be altered as needed to run less efficiently or noisier as needed to maintain useful machinery operation.

Thus the subject invention integrates the aforementioned optimization functionality with asset management and logistics systems such as e-commerce systems. Such tightly integrated approach can enable a process to predict a failure, establish when a replacement component could be delivered and installed, and automatically alter the control to insure continued operation until the replacement part arrives. For example, a needed replacement part could automatically be ordered and dynamically tracked via the Internet to facilitate continued operation. Alterations in the control could automatically be made based on changes in an expected delivery date and prognostic algorithms results. For example, a prognostic algorithm could determine a drive-end bearing system has degraded and has perhaps 500 operating hours left at the current speeds, loads, and temperatures. The correct needed replacement bearing could be automatically ordered via an e-commerce web site (e.g. PTPlace) and shipment tracked until the part arrived. The control may be automatically altered to extend the useful life of the bearing as required (e.g. reducing speed by ½ doubles the bearing life). Delays in receiving the needed replacement could cause the part to be ordered from another source and the control dynamically altered as needed. Maintenance could be scheduled to replace the part to coincide with the part arrival.

In the case of excessive maintenance costs, the optimization program could determine that continually replacing failing components is not longer an optimum strategy and could perform an economic analysis on a new more reliable component or a new machine. The new machine could provide a far more optimum solution than continually running in a degraded condition and replacing individual components. The new replacement machine (e.g. a motor) could be automatically ordered and scheduled to swap out the older, high-maintenance item. Optimization techniques that optimize the design and selection of components could be integrated with real-time dynamic optimization and integrated with internet-based product information and ordering information to provide a superior level of process optimization as compared to conventional asset management schemes.

Figure 8:
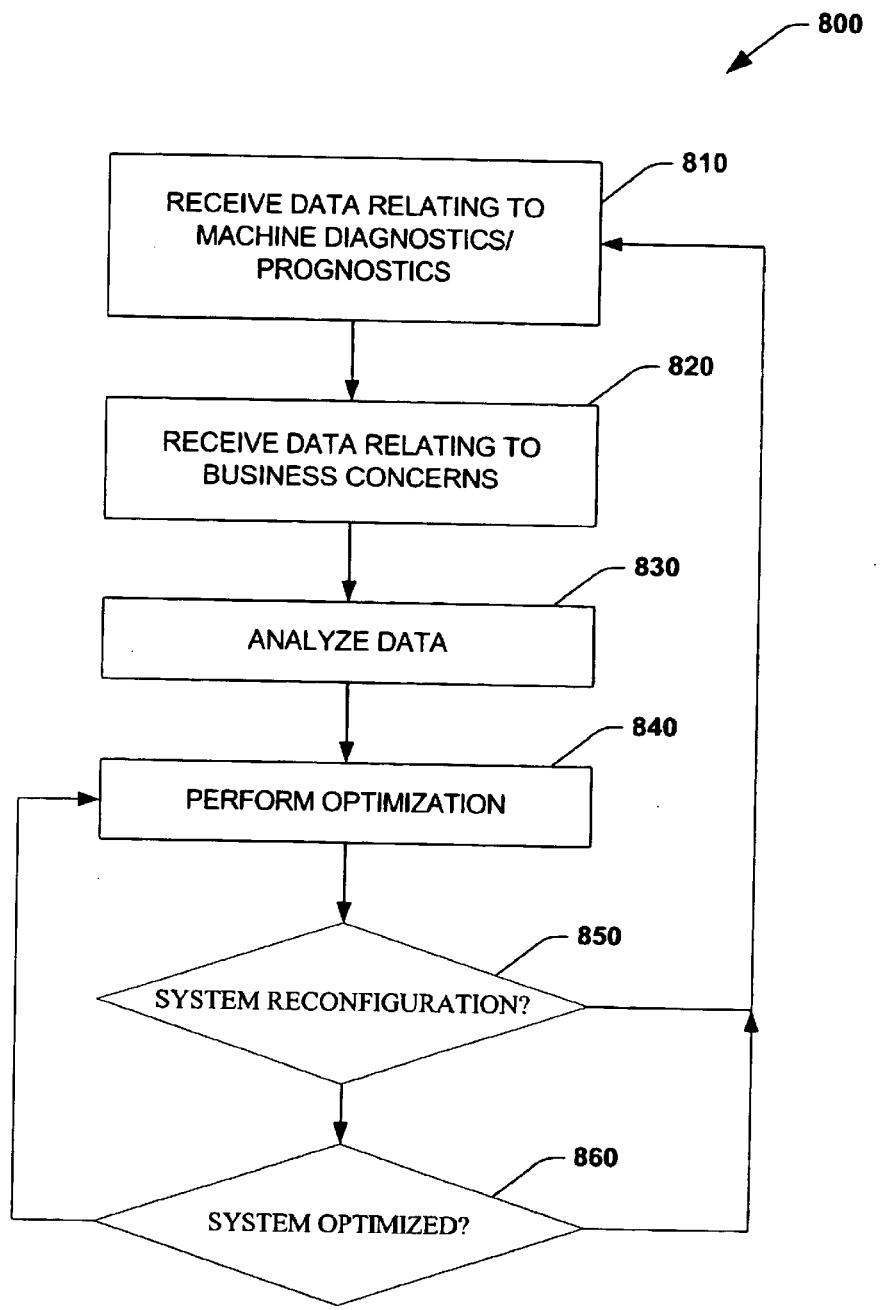
FIG. 8 is a high-level flow diagram in accordance with one particular aspect of the subject invention.

In view of the exemplary systems shown and described above, methodologies that may be implemented in accordance with the present invention will be better appreciated with reference to the flow diagram of FIG. 8. While, for purposes of simplicity of explanation, the methodology is shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodology in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

FIG. 8 is a high-level flow diagram depicting one particular methodology 800 in connection with facilitating optimizing an industrial automation system in accordance with the subject invention. At 810, data relating to machine diagnostic or prognostics is received. The data can be collected from a historical database, collected in situ for example from operation of the various machines, collected via various sensing devices, and generated via analyzing the aforementioned collected data. The generated data can also relate to future predicted states of the respective machines and/or with respect to clusters of the machines.

The data can be obtained for example via measuring an attribute associated with a motorized system (e.g., motorized pump, fan, conveyor system, compressor, gear box, motion control device, screw pump, and mixer, hydraulic or pneumatic machine, or the like). The measured attribute may comprise, for example, vibration, pressure, current, speed, and/or temperature associated with the motorized system. The data can comprise data relating to the health of the motorized system according to the measured attribute. For example, diagnostics data can be generated which may be indicative of the diagnosed motorized system health, whereby the motorized system is operated according to a setpoint and/or the diagnostics data generated. The provision of the diagnostics data may comprise for example obtaining a frequency spectrum of the measured attribute and analyzing the frequency spectrum in order to detect faults, component wear or degradation, or other adverse condition in the motorized system, whether actual or anticipated. The diagnosis may further comprise analyzing the amplitude of a first spectral component of the frequency spectrum at a first frequency.

In order to provide the diagnostics data, the invention may provide the measured attribute(s) to a neural network, an expert system, a fuzzy logic system, and/or a data fusion component, or a combination of these, which generates the diagnostics signal indicative of the health of the motorized system. For example, such frequency spectral analysis may be employed in order to determine faults or adverse conditions associated with the system or components therein (e.g., motor faults, unbalanced power source conditions, etc.). In addition, the diagnosis may identify adverse process conditions, such as cavitation in a motorized pumping system.

At 820 data relating to various business concerns (e.g., inventory, revenue, marketing, accounting, utilities, cash flow, mission statements, manufacturing, logistics, asset management, layout, processes . . . ) is received and/or generated. Such data can be gathered for example from various business software packages, manually, spreadsheets, etc. Moreover, some of the data may be generated via employment of artificial intelligence systems (e.g., neural networks, belief networks, fuzzy logic systems, expert systems, data fusion engines, combination thereof).

At 830 and 840, the data is analyzed in connection with optimization software that analyzes the machine data as well as the business concern data. Such analysis can include searching for and identifying correlations amongst the data, trend analysis, inference analysis, data mining, data fusion analysis, etc. in an effort to identify schemes for reorganizing, restructuring, modifying, adding and/or deleting the various machine and business components so as to facilitate optimizing the overall business system or method in accordance with identified business objective(s).

At 850, a determination is made as to whether component or system reconfiguration may result in convergence toward optimization. If YES, the system is reconfigured in a manner coincident with a predicted configuration expected to achieve a more desired end result. If, NO, the process returns to 810.

At 860, a determination is made as to whether the system has been optimized. If NO, the process returns to 640. If YES, the process returns to 810.

Figure 9:
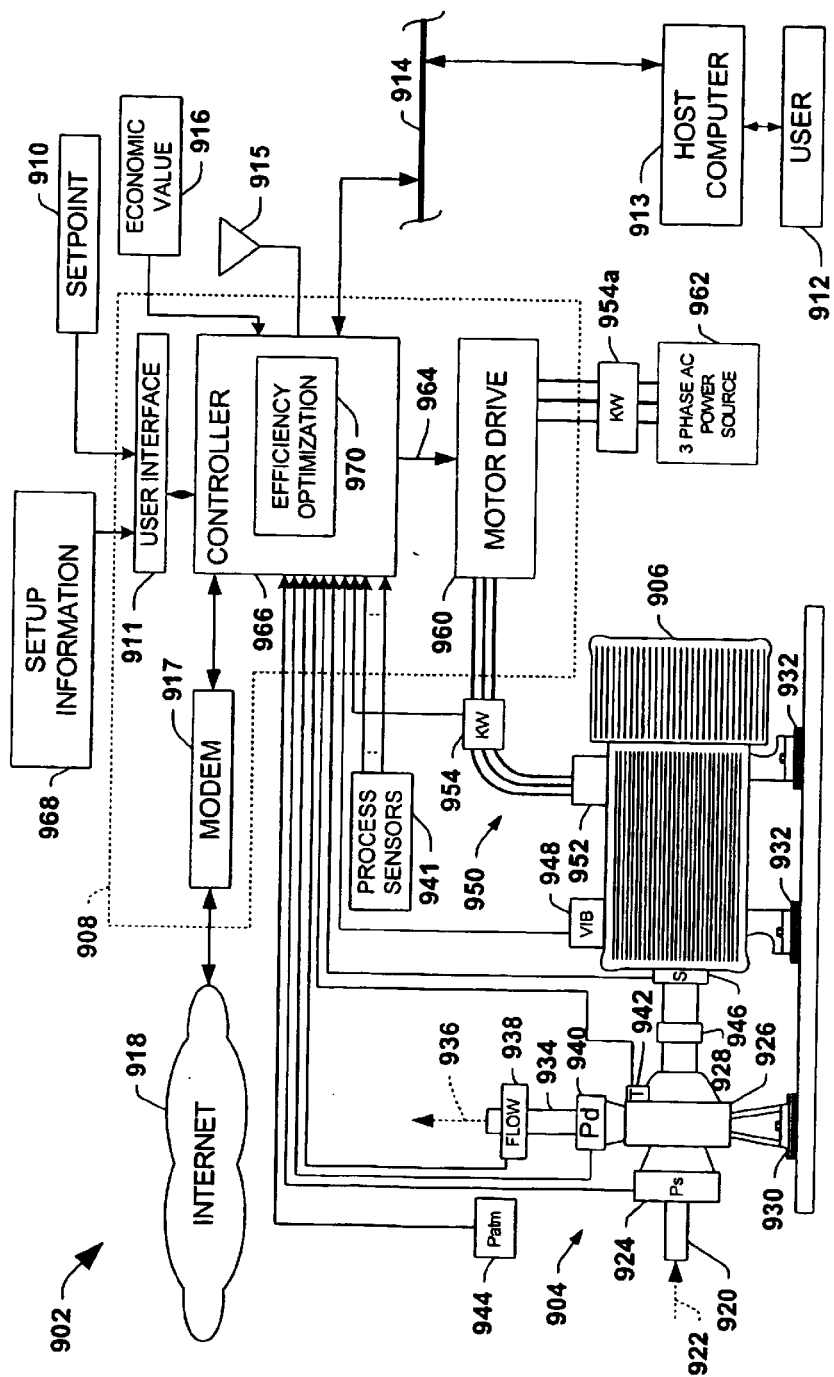
FIG. 9 is a side elevation view illustrating an exemplary motorized pump system and a control system therefor with an optimization component in accordance with an aspect of the present invention.

The following discussion with reference to FIGS. 9–20 provides additional detail as to exemplary systems and methods for collecting and analyzing machine data in connection with the subject invention. It is to be appreciated that such discussion is merely provided to ease understanding of the subject invention, and not to limit the invention to such systems and methods. In FIG. 9, an exemplary motorized pump system 902 is illustrated having a pump 904, a three phase electric motor 906, and a control system 908 for operating the system 902 in accordance with a setpoint 910. While the exemplary motor 906 is illustrated and described herein as a polyphase synchronous electric motor, the various aspects of the present invention may be employed in association with single-phase motors as well as with DC and other types of motors. In addition, the pump 904 may comprise a centrifugal type pump, however, the invention finds application in association with other pump types not illustrated herein, for example, positive displacement pumps.

The control system 908 operates the pump 904 via the motor 906 according to the setpoint 910 and one or more measured process variables, in order to maintain operation of the system 902 commensurate with the setpoint 910 and within allowable process operating ranges specified in setup information 968, supplied to the control system 908 via a user interface 911. For example, it may be desired to provide a constant fluid flow, wherein the value of the setpoint 910 is a desired flow rate in gallons per minute (GPM) or other engineering units. The setup information 968, moreover, may comprise an allowable range of operation about the setpoint 910 (e.g., expressed in GPM, percentage of process variable span, or other units), and allowable range of operation for other process and machinery parameters such as temperature, pressure, or noise emission, wherein the control system 908 may operate the system 902 at an operating point within the allowable range.

Alternatively or in combination, setup information, setpoints, and other information may be provided to the control system 908 by a user 912 via a computer 913 operatively connected to a network 914, and/or by wireless communications via a transceiver 915. Such information may be provided via the network 914 and/or the wireless communications transceiver 915 from a computer (e.g., computer 913) and/or from other controllers such as a programmable logic controller (PLC, not shown) in a larger process, wherein the setpoint 910, setup information, and/or one or more economic values 916 (e.g., related to or indicative of energy costs, which may vary with time, peak loading values, and current loading conditions, material viscosity values, and the like) are provided to the control system 908, as illustrated and described in greater detail hereinafter. The control system 908, moreover, may include a modem 917 allowing communication with other devices and/or users via a global communications network, such as the Internet 918, whereby such setpoint, setup, performance, and other information may be obtained or provided to or from remote computers or users. In this regard, it will be appreciated that the modem 917 is not strictly required for Internet or other network access.

The pump 904 comprises an inlet opening 920 through which fluid is provided to the pump 904 in the direction of arrow 922 as well as a suction pressure sensor 924, which senses the inlet or suction pressure at the inlet 920 and provides a corresponding suction pressure signal to the control system 908. Fluid is provided from the inlet 920 to an impeller housing 926 including an impeller (not shown), which rotates together with a rotary pump shaft coupled to the motor 906 via a coupling 928. The impeller housing 926 and the motor 906 are mounted in a fixed relationship with respect to one another via a pump mount 930, and motor mounts 932. The impeller with appropriate fin geometry rotates within the housing 926 so as to create a pressure differential between the inlet 920 and an outlet 934 of the pump. This causes fluid from the inlet 920 to flow out of the pump 904 via the outlet or discharge tube 934 in the direction of arrow 936. The flow rate of fluid through the outlet 934 is measured by a flow sensor 938, which provides a flow rate signal to the control system 908.

In addition, the discharge or outlet pressure is measured by a pressure sensor 940, which is operatively associated with the outlet 934 and provides a discharge pressure signal to the control system 908. It will be noted at this point that although one or more sensors (e.g., suction pressure sensor 924, discharge pressure sensor 940, outlet flow sensor 938, and others) are illustrated in the exemplary system 902 as being associated with and/or proximate to the pump 904, that such sensors may be located remote from the pump 904, and may be associated with other components in a process or system (not shown) in which the pump system 902 is employed. In this regard, other process sensors 941 may be connected so as to provide signals to the control system 908, for example, to indicate upstream or downstream pressures, flows, or the like. Alternatively, flow may be approximated rather than measured by utilizing pressure differential information, pump speed, fluid properties, and pump geometry information or a pump model. Alternatively or in combination, inlet and/or discharge pressure values may be estimated according to other sensor signals (e.g., 941) and pump/process information.

It will be further appreciated that while the motor drive 960 is illustrated in the control system 908 as separate from the motor 906 and from the controller 966, that some or all of these components may be integrated. Thus, for example, an integrated, intelligent motor may be provided integral to or embedded with the motor 906, to include the motor drive 960 and the controller 966. Furthermore, the motor 906 and the pump 904 may be integrated into a single unit (e.g., having a common shaft wherein no coupling 928 is required), with or without an integral control system (e.g., control system 908, comprising the motor drive 960 and the controller 966) in accordance with the invention.

The control system 908 further receives process variable measurement signals relating to pump temperature via a temperature sensor 942, atmospheric pressure via a pressure sensor 944 located proximate the pump 904, motor (pump) rotational speed via a speed sensor 946, and vibration via sensor 948. Although the vibration sensor 948 is illustrated and described hereinafter as mounted on the motor 906, vibration information may, alternatively or in combination, be obtained from a vibration sensor mounted on the pump 906 (not shown). The motor 906 provides rotation of the impeller of the pump 904 according to three-phase alternating current (AC) electrical power provided from the control system via power cables 950 and a junction box 952 on the housing of the motor 906. The power to the pump 904 may be determined by measuring the current and voltage provided to the motor 906 and computing pump power based on current, voltage, speed, and motor model information such as efficiency. This may be measured and computed by a power sensor 954, which provides a signal related thereto to the control system 908. Alternatively or in combination, the motor drive 960 may provide motor torque information to the controller 966 where pump input power is calculated according to the torque and possibly speed information.

Alternatively, input current and possibly voltage may be measured from the power lines going from the power source 962 to the motor drive 960 using a sensor 954a. Drive efficiency and/or motor efficiency equations may be used to determine the power going into the pump 904. It will be noted that either or both of the sensors 954 and 954a can be integrated into the motor drive 960.

The control system 908 also comprises a motor drive 960 providing three-phase electric power from an AC power source 962 to the motor 906 via the cables 950 in a controlled fashion (e.g., at a controlled frequency and amplitude) in accordance with a control signal 964 from a controller 966. The controller 966 receives the process variable measurement signals from the atmospheric pressure sensor 944, the suction pressure sensor 924, the discharge pressure sensor 940, the flow sensor 938, the temperature sensor 942, the speed sensor 946, the vibration sensor 948, the power sensor 954, and other process sensors 941, together with the setpoint 910, and provides the control signal 964 to the motor drive 960 in order to operate the pump system 902 commensurate with the setpoint 910 within specified operating limits. In this regard, the controller 966 may be adapted to control the system 902 to maintain a desired fluid flow rate, outlet pressure, motor (pump) speed, torque, suction pressure, or other performance characteristic.

Setup information 968 may be provided to the controller 966, which may include operating limits (e.g., min/max speeds, min/max flows, min/max pump power levels, min/max pressures allowed, NPSHR values, and the like), such as are appropriate for a given pump 904, motor 906, piping and process conditions, and/or process dynamics and other system constraints. The control system 908 provides for operation within an allowable operating range about the setpoint 910, whereby the system 902 is operated at a desired operating point within the allowable range, in order to optimize one or more performance characteristics (e.g., such as life cycle cost, efficiency, life expectancy, safety, emissions, operational cost, MTBF, noise, vibration, and the like).

Figure 10:
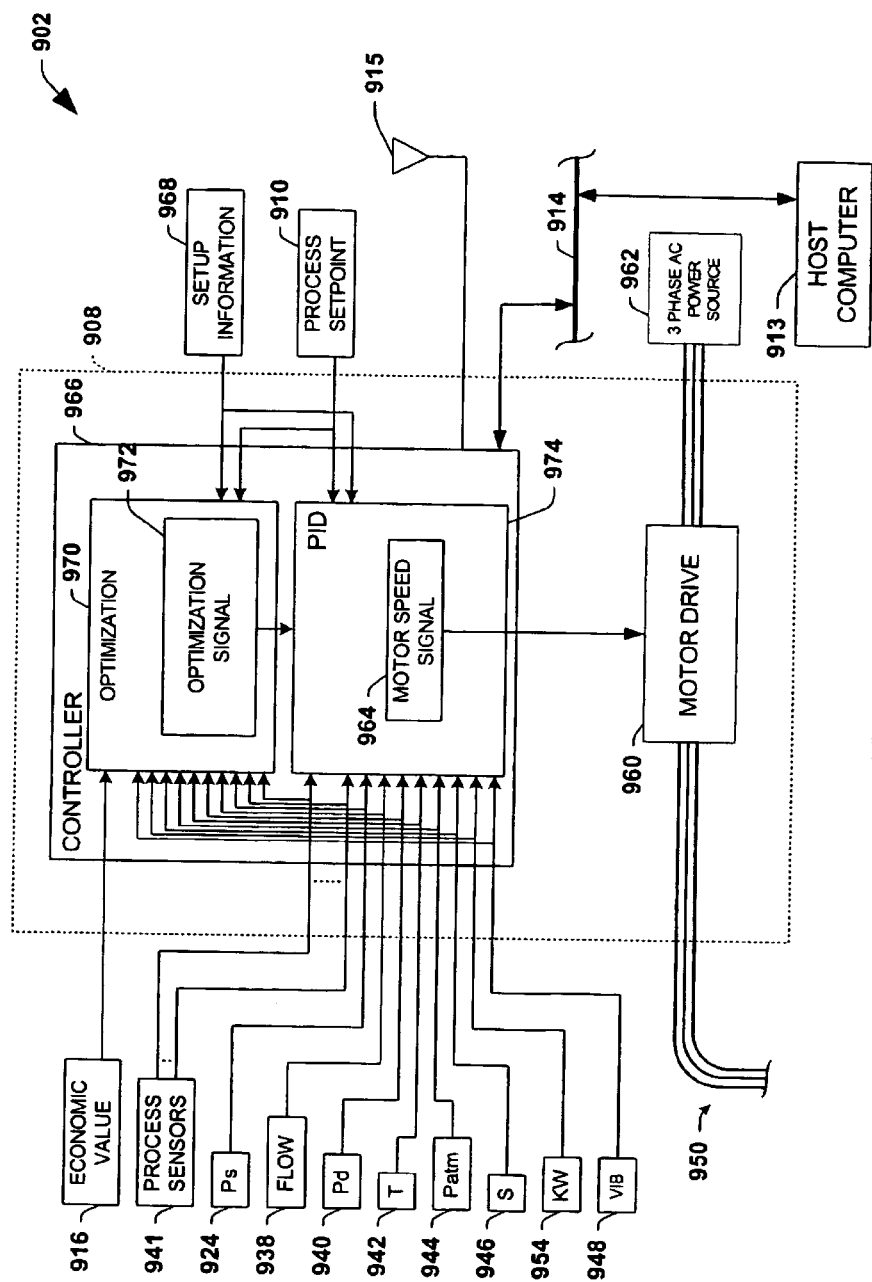
FIG. 10 is a schematic diagram illustrating further details of the exemplary control system of FIG. 9.

Referring also to FIG. 10, the controller 966 comprises an optimization component 970, which is adapted to select the desired operating point for pump operation within the allowable range about the setpoint 910, according to an aspect of the invention. As illustrated and described hereinafter, the optimization component 970 may be employed to optimize efficiency or other performance characteristics or criteria, including but not limited to throughput, lifetime, or the like. The component 970, moreover, may select the desired operating point according to performance characteristics associated with one or more components in the system 902 or associated therewith. For example, the optimization component 970 may generate an optimization signal 972 by correlating pump, motor, and or motor drive efficiency information associated with the pump 904, motor 906, and motor drive 960, respectively, to derive a correlated process efficiency associated with the entire system 902.

Such component efficiency information may be obtained, for example, from setup information 969 such as efficiency curves for the pump 904, motor 906, and drive 960 alone or in combination with such information derived from one or more of the sensors 924, 938, 940, 941, 942, 944, 946, 954, 954a, and/or 948. In this manner, the efficiency of a particular component (e.g., pump 904, motor 906, and drive 960) in the system 902 may be determined from manufacturer data, which may be supplemented, enhanced, or replaced with actual measured or computed efficiency information based on prior operation and/or diagnosis of one or more such components.

The optimization component 970, moreover, may correlate efficiency information related to the components of the system 902, along with such efficiency information related to components of a larger process or system of which the system 902 is a part, in order to select the desired operating point for optimization of overall system efficiency. Thus, for example, the controller 966 may generate the control signal 964 to the motor drive 960 according to the optimization signal 972 from the optimization component 970, based on the optimum efficiency point within the allowable operating range according to the correlated process efficiency for the system 902. Furthermore, it will be appreciated that performance information associated with components in unrelated systems may be employed (e.g., efficiency information related to motors in other, unrelated systems within a manufacturing facility) in optimizing energy usage across the entire facility.

Alternatively or in combination, the controller 966 may operate the pump within the allowable range about the setpoint 910 in order to achieve global optimization of one or more performance characteristics of a larger process or system of which the pump system 902 is a part. Thus, for example, the components (e.g., pump 904, motor 906, drive 960) of the system 902 may be operated at less than optimal efficiency in order to allow or facilitate operation of such a larger process at optimal efficiency. The controller 966 selectively provides the control signal 964 to the motor drive 960 according to the setpoint 910 (e.g., in order to maintain or regulate a desired flow rate) as well as to optimize a performance characteristic associated with the system 902 or a larger process, via the optimization signal 972. Thus, in one example flow control is how optimization is achieved in this example. It will be noted that the allowable range of operation may be provided in lieu of an actual setpoint, or the allowable range may be derived using the setpoint value 910.

In this regard, the controller 966 may provide the control signal 964 as a motor speed signal 964 from a PID control component 974, which inputs process values from one or more of the sensors 924, 938, 940, 942, 944, 946, 948, 954, and 954a, economic values 916, and the setpoint 910, wherein the magnitude of change in the control signal 964 may be related to the degree of correction required to accommodate the present control strategy, for example, such as system efficiency, and/or the error in required versus measured process variable (e.g., flow). Although the exemplary controller 966 is illustrated and described herein as comprising a PID control component 974, control systems and controllers implementing other types of control strategies or algorithms (e.g., PI control, PID with additional compensating blocks or elements, stochastics, non-linear control, state-space control, model reference, adaptive control, self-tuning, sliding mode, neural networks, GA, fuzzy logic, operations research (OR), linear programming (LP), dynamic programming (DP), steepest descent, or the like) are also contemplated as falling within the scope of the present invention.

The exemplary PID component 974 may compare a measured process variable (e.g., flow rate measured by sensor 938) with the desired operating point within the allowable range about the setpoint 910, where the setpoint 910 is a target setpoint flow rate, and wherein one or more of the process variable(s) and/or the desired operating point (e.g., as well as the allowable operating range about the setpoint) may be scaled accordingly, in order to determine an error value (not shown). The error value may then be used to generate the motor speed signal 964, wherein the signal 964 may vary proportionally according to the error value, and/or the derivative of the error, and/or the integral of the error, according to known PID control methods.

The controller 966 may comprise hardware and/or software (not shown) in order to accomplish control of the process 902. For example, the controller 966 may comprise a microprocessor (not shown) executing program instructions for implementing PID control (e.g., PID component 974), implementing the efficiency or other performance characteristic optimization component 970, inputting of values from the sensor signals, providing the control signal 964 to the motor drive 960, and interacting with the user interface 911, the network 914, modem 917, and the transceiver 915. The user interface 911 may allow a user to input setpoint 910, setup information 968, and other information, and in addition may render status and other information to the user, such as system conditions, operating mode, diagnostic information, and the like, as well as permitting the user to start and stop the system and override previous operating limits and controls. The controller 966 may further include signal conditioning circuitry for conditioning the process variable signals from the sensors 916, 924, 938, 940, 941, 942, 944, 946, 948, and/or 954.

The controller 966, moreover, may be integral with or separate from the motor drive 960. For example, the controller 966 may comprise an embedded processor circuit board mounted in a common enclosure (not shown) with the motor drive 960, wherein sensor signals from the sensors 916, 924, 938, 940, 941, 942, 944, 946, 948, and/or 954 are fed into the enclosure, together with electrical power lines, interfaces to the network 914, connections for the modem 917, and the transceiver 915, and wherein the setpoint 910 may be obtained from the user interface 911 mounted on the enclosure, and/or via a network, wireless, or Internet connection. Alternatively, the controller 966 may reside as instructions in the memory of the motor drive 960, which may be computed on an embedded processor circuit that controls the motor 906 in the motor drive 960.

In addition, it will be appreciated that the motor drive 960 may further include control and feedback components (not shown), whereby a desired motor speed (e.g., as indicated by the motor speed control signal 964 from the PID component 974) is achieved and regulated via provision of appropriate electrical power (e.g., amplitude, frequency, phasing, etc.) from the source 962 to the motor 906, regardless of load fluctuations, and/or other process disturbances or noise. In this regard, the motor drive 960 may also obtain motor speed feedback information, such as from the speed sensor 946 via appropriate signal connections (not shown) in order to provide closed loop speed control according to the motor speed control signal 964 from the controller 966. In addition, it will be appreciated that the motor drive 960 may obtain motor speed feedback information by means other than the sensor 946, such as through internally computed speed values, as well as torque feedback information, and that such speed feedback information may be provided to the controller 966, whereby the sensor 946 need not be included in the system 902. One control technique where the motor drive 960 may obtain torque and speed information without sensors is when running in a vector-control mode.

Figure 11:
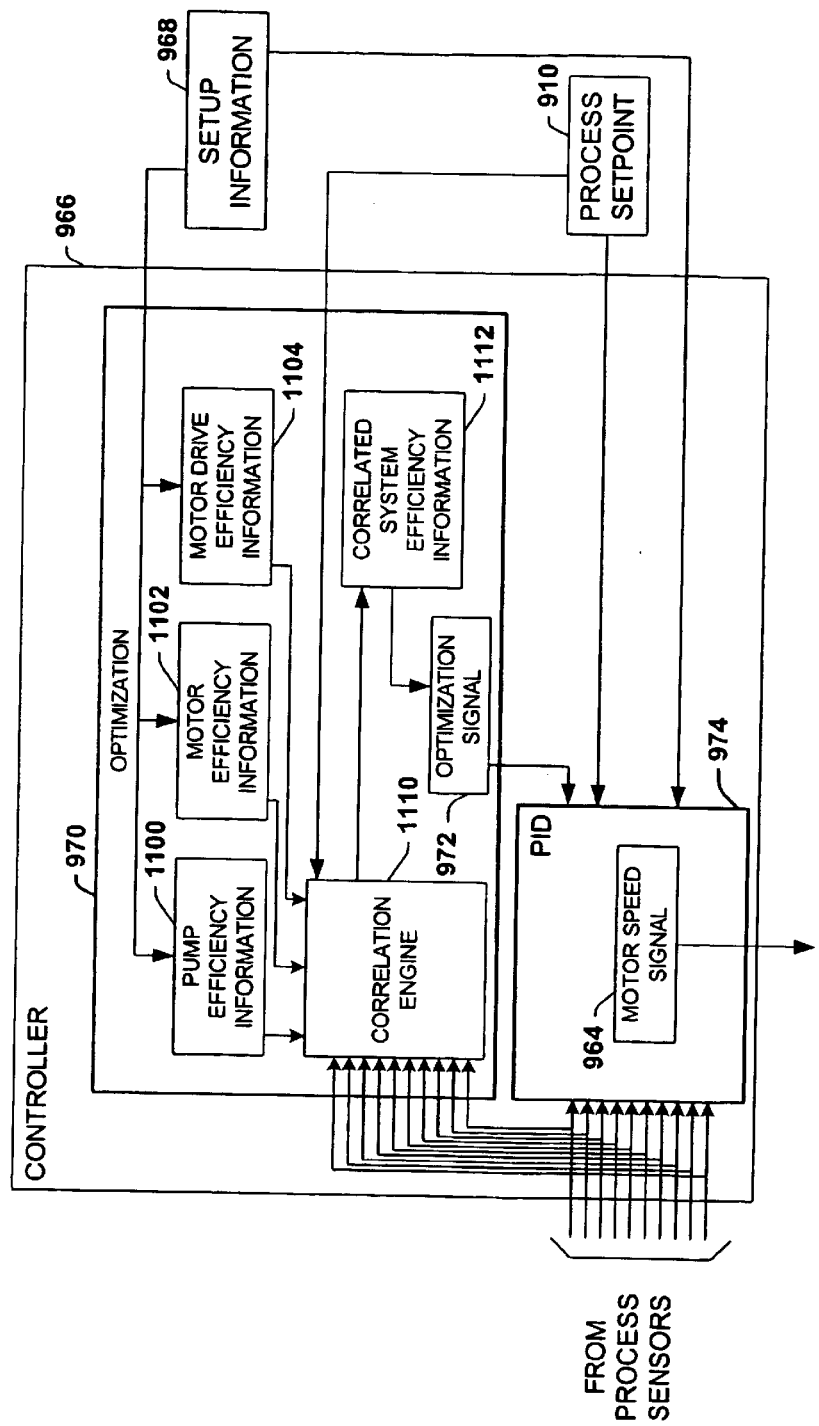
FIG. 11 is a schematic diagram further illustrating the efficiency optimization component and controller of FIGS. 9 and 10.

As further illustrated in FIG. 11, the optimization component 970 correlates component performance information (e.g., efficiency information) associated with one or more components (e.g., pump 704, motor 706, motor drive 760, etc.) in the system 702 in order to derive correlated process performance information. In addition, the component 970 may employ performance information associated with other components in a larger process (not shown) of which the system 702 is a part, in order to derive correlated performance information. It will be appreciated that the optimization component 970, moreover, may correlate information other than (or in addition to) efficiency information, including but not limited to life cycle cost, efficiency, life expectancy, safety, emissions, operational cost, MTBF, noise, vibration, and the like.

The optimization component 970 selects the desired operating point as the optimum performance point within the allowable range of operation according to the correlated process performance information. As illustrated in FIG. 9, the controller 966 may obtain pump efficiency information 900 related to the pump 704, motor efficiency information 902 related to the motor 706, and motor drive efficiency information 904 related to the motor drive 760, which is provided to a correlation engine 910 in the optimization component 970. The correlation engine 910 correlates the information 900, 902, and/or 904 according to present operating conditions (e.g., as determined according to values from one or more of the process sensors 924, 938, 940, 941, 942, 944, 946, 948, and/or 954, economic value(s) 916, setpoint 910, and allowable operating range information from setup information 968) in order to determine a desired operating point within the allowable operating range at which the efficiency of the system 902 or a larger process (not shown) may be optimal.

In this regard, the correlation engine 1110 may compute, predict, or derive correlated system efficiency information 1112 from the correlation of one or more of the pump efficiency information 1100 related to the pump 1104, motor efficiency information 1102 related to the motor 906, and motor drive efficiency information 904 related to the motor drive 960. The correlation may be accomplished in the correlation engine 1110 through appropriate mathematical operations, for example, in software executing on a microprocessor within the controller 966. Appropriate weighting factors may be assigned to the relevant information being correlated (e.g., 1100, 1102, and 1104), for instance, whereby the efficiency of the pump 904 may be given more weight than that of the motor drive 960. The invention can also be employed to provide near-optimal operation to enhance robustness (e.g., to reduce sensitivity), in order to provide better overall optimization.

The correlation engine 1110, moreover, may determine correlated system efficiency information according to the current operating conditions of the system 902, such as the process setpoint 910, diagnosed degradation of system components, etc. Thus, for example, the correlated system efficiency information 1112 may include different desired operating points depending on the setpoint 910, and/or according to the current pressures, flow rates, temperatures, vibration, power usage, etc., in the system 902, as determined by the values from one or more of the sensors 924, 938, 940, 941, 942, 944, 946, 948, and/or 954. The controller 966 then provides the control signal 964 as a motor speed signal 964 to the motor drive 960 according to the desired operating point. In addition to efficiency information (e.g., 1100, 1102, 1104) the component performance information may also comprise one or more of life cycle cost information, efficiency information, life expectancy information, safety information, emissions information, operational cost information, MTBF information, noise information, and vibration information. The correlation engine 1110 can also comprise algorithms employing temporal logic. This permits the correlation engine 1110 to establish dynamic, time varying control signals to optimize system operation over a time horizon. For example, if energy costs are to rise during peak daytime periods, the correlation engine may prescribe a slightly higher throughput during off-peak hours (e.g., less energy efficient during off-peak hours) in order to minimize operation during more costly peak energy cost periods.

Figure 12:
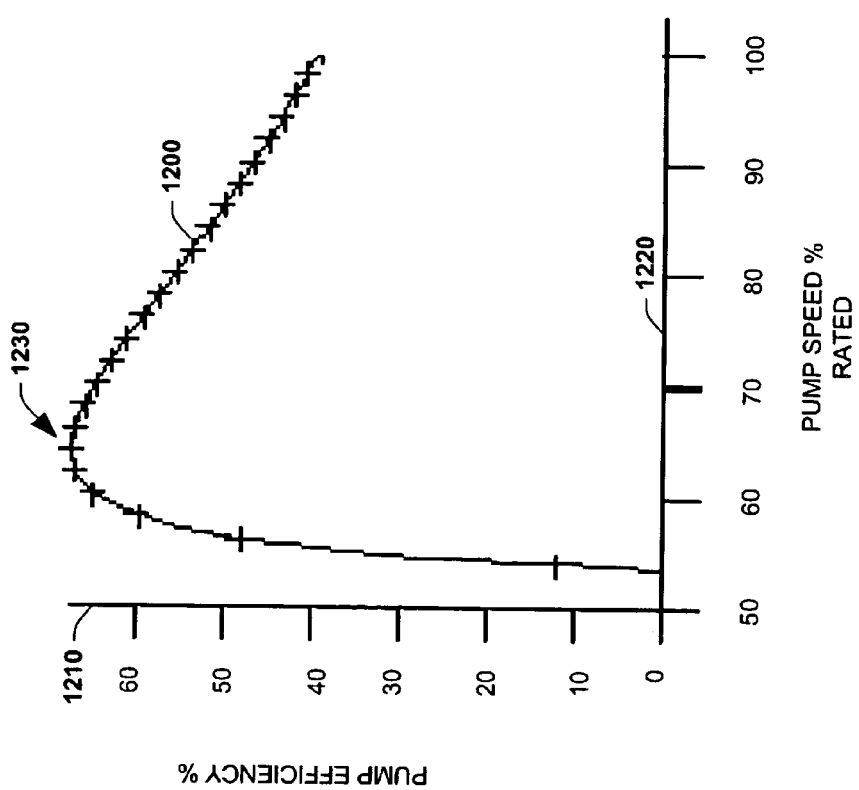
FIG. 12 is a plot showing an exemplary pump efficiency curve.
Figure 13:
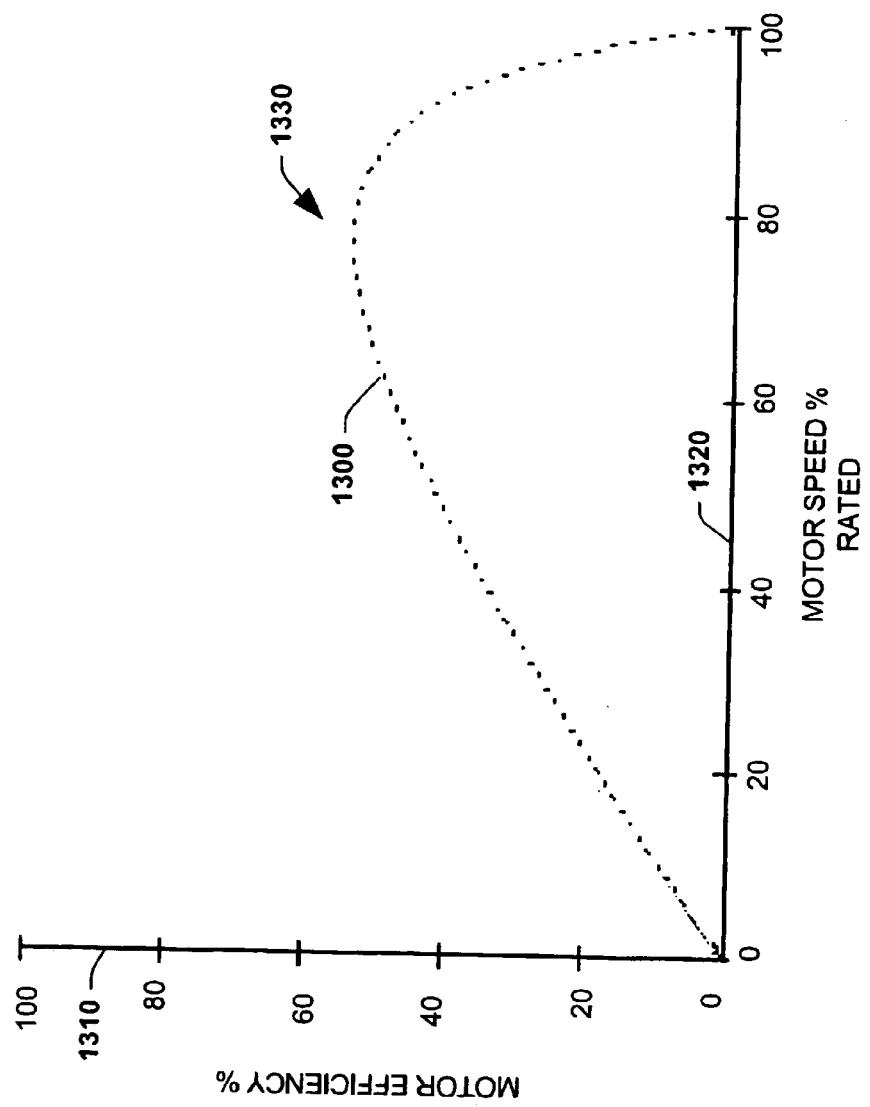
FIG. 13 is a plot showing an exemplary motor efficiency curve.
Figure 14:
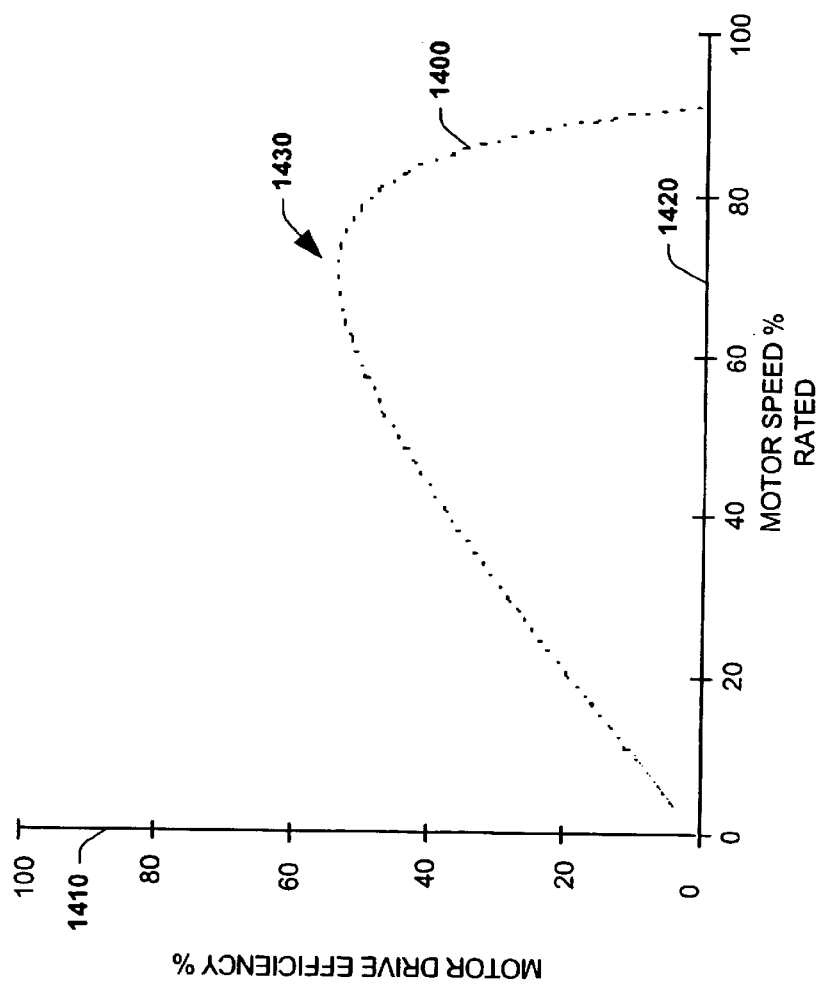
FIG. 14 is a plot showing an exemplary motor drive efficiency curve.

FIGS. 12–14 illustrate examples of component performance characteristic information, which may be correlated (e.g., via the correlation engine 1110) in order to select the desired operating point for the system 902. FIG. 12 illustrates a plot of an exemplary pump efficiency curve 1200 (e.g., related to pump 904), plotted as efficiency 1210 (e.g., output power/input power) versus pump speed 1220. The exemplary curve 1200 comprises a best operating point 1230, whereat the pump efficiency is optimal at approximately 62% of maximum rated pump speed. The pump efficiency information 1100 of the optimization component 970 may comprise one or more such curves, for example, wherein different curves exist for different flow rates, pressures, temperatures, viscosity of pumped fluid, etc. Similarly, FIG. 13 illustrates a plot of an exemplary motor efficiency curve 1300 (e.g., related to motor 906), plotted as efficiency 1310 (e.g., output power/input power) versus motor speed 1320. The exemplary curve 1300 comprises a best operating point 1330, whereat the motor efficiency is optimal at approximately 77% of maximum rated speed.

It will be appreciated from the curves 1200 and 1300 of FIGS. 12 and 13, respectively, that the optimal efficiency operating points for individual components (e.g., pump 904 and motor 906) of the system 902, or of typical motorized systems generally, may not, and seldom do, coincide. The pump efficiency information 1100 of the optimization component 970 may comprise one or more such curves 1230 of pump efficiency versus speed, for example, wherein a different curve exists for different flow rates, pressures, viscosity of pumped fluid, motor load, etc. In like fashion, FIG. 14 illustrates a plot of an exemplary motor drive efficiency curve 1400 (e.g., related to the motor drive 960 of system 902), plotted as efficiency 1410 (e.g., output power/input power) versus motor (e.g., pump) speed 1420. The exemplary curve 1400 comprises a best operating point 1430, whereat the motor drive efficiency is optimal at approximately 70% of the rated speed. The motor drive efficiency information 1104 of the optimization component 970 may comprise one or more such curves, for example, wherein a different curve exists for different flow rates, temperatures, torques, pressures, viscosity of pumped fluid, motor load, motor temperature, etc.

Figure 15:
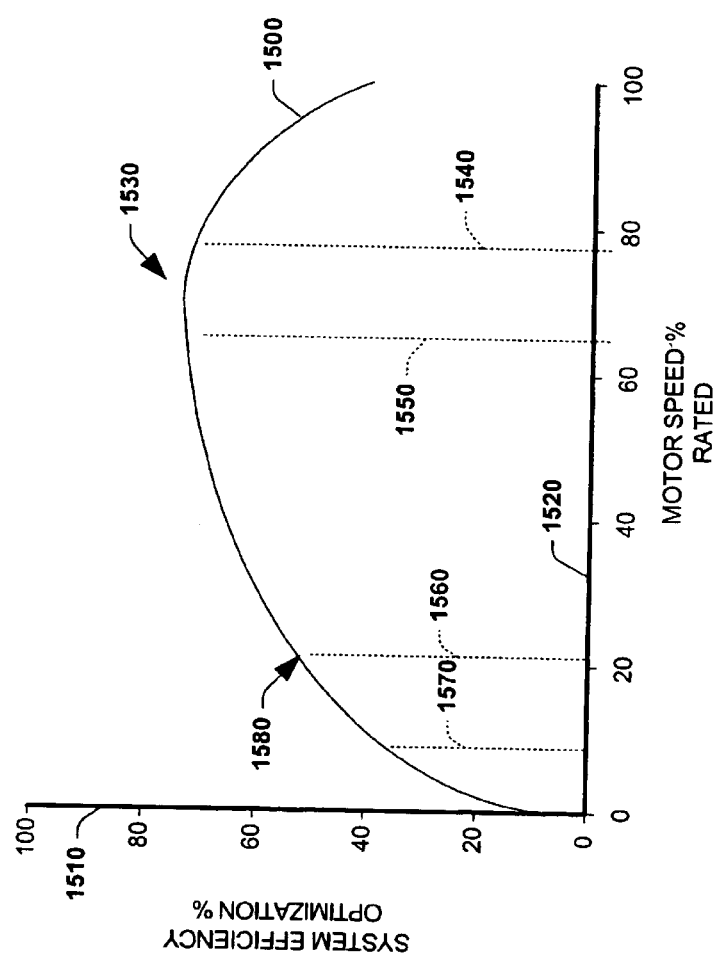
FIG. 15 is a plot showing an exemplary correlated pump system efficiency optimization curve in accordance with the invention.

The correlation engine 1110 of the efficiency optimization component 970 correlates the three curves 1200, 1300, and 1400 in order to derive correlated system efficiency information 1112. Referring now to FIG. 15, the correlation engine may correlate the curves 1200, 1300, and 1400 to derive a correlated system efficiency curve 1500 plotted as system efficiency optimization 1510 versus speed 1520. The exemplary curve 1500 comprises a peak optimization point 1530 at approximately 71% of rated speed. This composite performance characteristic curve 1500 may then be employed by the optimization component 970 in order to select the desired operation point for the system 902, which may be provided to the PID 974 via the optimization signal 972.

As illustrated in FIG. 15, where the allowable operating range includes an upper limit 1540, and a lower limit 1550 (e.g., where these limits 1540 and 1550 are scaled from process units, such as flow in GPM into speed), the optimization component 970 may advantageously select the peak optimization point 1530 at approximately 71% of rated speed, in order to optimize the efficiency within the allowable operating range. In another example, where the allowable upper and lower limits 1560 and 1570 are specified, a local optimum 1580 within that range may be selected as the desired operating point. Many other forms of performance information and correlations thereof are possible within the scope of the present invention, beyond those illustrated and described above with respect to FIGS. 12–15. The preceding discussion described sending a motor speed signal (e.g., signal 964) to the motor drive 960. Alternatively or in combination, other drive parameters (e.g., carrier frequency, control mode, gains, and the like) can be changed, enhanced, modified, etc., in accordance with the invention. This can enable even more efficient operation, for example, by changing the efficiency 1500.

Referring now to FIGS. 16–20, the optimization aspects of the invention may be employed across a plurality of controllers operating various actuators (e.g., valves, switches, and the like) and motorized systems (e.g., pumps, mixers, compressors, conveyors, fans, and the like) in a large process or system 1600, for optimization of one or more performance characteristics for unrelated motorized systems. Such sub-systems may comprise individual controllers, such as valve controllers, motor controllers, as well as associated motors and drives. As illustrated in FIG. 16, an integer number N of such individual motor controllers MC1 through MCN may be networked together via a network 1602, allowing peer-to-peer communication therebetween, wherein MC1 controls a motorized pump PUMP1 via a motor M1 and associated motor drive MD1, and MCN controls a motorized pump PUMPN via a motor MN and associated motor drive MDN. Other controllers, such as valve controller VC1 may be connected to the network 1602, and operative to control a valve VALVE1. It is to be appreciated that that the motor controller may be embedded in the motor drive such that MC1 and MD1 are one component.

The controllers MC1–MCN and VC1 may exchange information relating to process conditions (e.g., flow, pressure, power, efficiency, temperature . . . ), control information (e.g., setpoints, control outputs, alarm conditions, process limits . . . ), and performance characteristic information (e.g., related to life cycle cost information, efficiency information, life expectancy information, safety information, emissions information, operational cost information, MTBF information, noise information, vibration information, production requirements, delivery schedules, and the like). One or more of the individual controllers MC1, MCN, and VC1 may determine desired operating points for the associated sub-systems according to performance characteristic information obtained from other controllers via the network 1602, and/or from sensors associated with the individual sub-systems.

Another possible configuration is illustrated in FIG. 17, wherein a host computer 1704 is connected to the network 1702. The host 1704 may provide centralized operation of the pumps PUMP1 and PUMPN as well as of the valve VALVE1, for example, by providing setpoint information to the associated controllers MC1, MCN, and VC1. Other information may be exchanged between the computer 1704 and the various controllers MC1, MCN, and VC1 in host-to-peer fashion, such as information relating to process conditions, control information, and performance characteristic information, whereby an efficiency optimization component 1706 in the host computer 1704 may determine desired operating points for one or more of the controllers MC1, MCN, and VC1 according to one or more performance characteristics associated with the system 1700. Alternatively or in combination, one or more of the individual controllers MC1, MCN, and VC1 may determine desired operating points for the associated sub-systems according to performance characteristic information obtained from the host computer 1704, from other controllers via the network 1702, and/or from sensors associated with the individual sub-systems.

Figure 18:
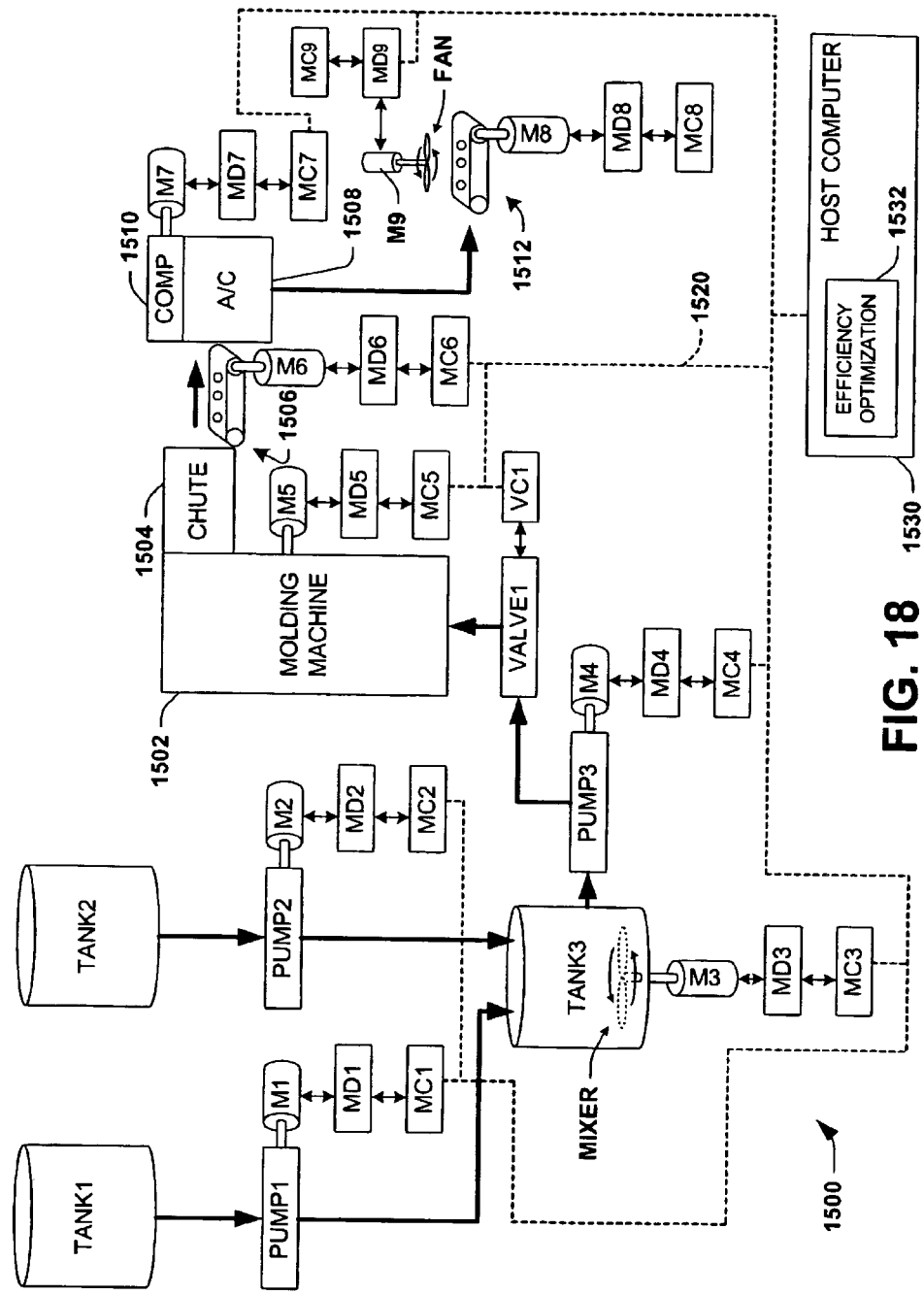
FIG. 18 is a schematic diagram illustrating an exemplary manufacturing system having multiple pump and valve controllers in which one or more aspects of the invention may be implemented.

Referring now to FIG. 18, another process 1500 is illustrated for providing material from first and second tanks TANK1 and TANK2 into a mixing tank TANK3 via pumps PUMP1 and PUMP2 with associated motors, drives and controllers. The material is mixed in TANK3 via a motorized mixer with associated motor M3, drive MD3, and controller MC3. Mixed material is then provided via a motorized pump PUMP3 and control valve VALVE1 to a molding machine 1502 with an associated motor M5, whereafter molded parts exit the machine 1502 via a chute 1504 to a motorized conveyor 1506 controlled by motor M6, which transports the molded parts to a cooler device 1508 having a motorized compressor 1510. The cooled parts are then provided to a second motorized conveyor 1512 whereat a motorized fan facilitates removal of moisture from the parts.

The various motor and valve controllers MC1–MC9 and VC1 associated with the various sub-systems of the process 1500 are networked together via a network 1520 in order to provide peer-to-peer or other types of communications therebetween. One or more of these controllers MC1–MC9 and VC1 may be adapted to correlate performance characteristic information associated with component devices (e.g., motors, drives, valves) in order to determine desired operating points for one, some, or all of the sub-systems in the process 1500 in accordance with the invention.

A host computer 1532, moreover, may be provided on the network 1520, which may comprise an optimization component 1532 operative to determine desired operating points (e.g., as well as setpoints, allowable operating ranges about such setpoints, and the like) for one or more of the sub-systems in the process 1500 according to one or more performance characteristics associated with the process 1500, which may be then communicated to the various controllers MC1–MC9 and VC1 in order to optimize performance of the process 1500 in some aspect (e.g., efficiency, cost, life cycle cost, throughput, efficiency, life expectancy, safety, emissions, operational cost, MTBF, noise, vibration, and the like). Thus, in accordance with the present invention, the process 1500 may be operated to both produce molded parts from raw materials, and at the same time to optimize one or more performance metrics, such as cost per part produced. Operation of the system may be controlled such that prognostic information regarding machinery failure, expected delivery of repair parts, and expected energy costs is considered in defining an optimum operating mode. For example, if the molding machine is predicted to fail in one week, then increased work-in-process inventory may be generated while the needed repair parts are automatically ordered and delivery expedited. Alternatively a more optimum control mode may be to operate the molding machine very slow and slow down other process equipment to maintain a lower production rate but a continuous flow of finished products.

Another aspect of the invention provides a methodology by which a motorized system may be controlled. The methodology comprises selecting a desired operating point within an allowable range of operation about a system setpoint according to performance characteristics associated with one or more components in the system, and controlling the system according to the desired operating point. The selection of the desired operating point may include correlating component performance information associated with one or more components in the system in order to derive correlated system performance information, and selecting the desired operating point as the optimum performance point within the allowable range of operation according to the correlated system performance information. The performance information, setpoint, and/or the allowable operating range may be obtained from a user or another device via a user interface, via a host computer or other controller through a network, via wireless communications, Internet, and/or according to prior operation of the system, such as through trend analysis.

Figure 19:
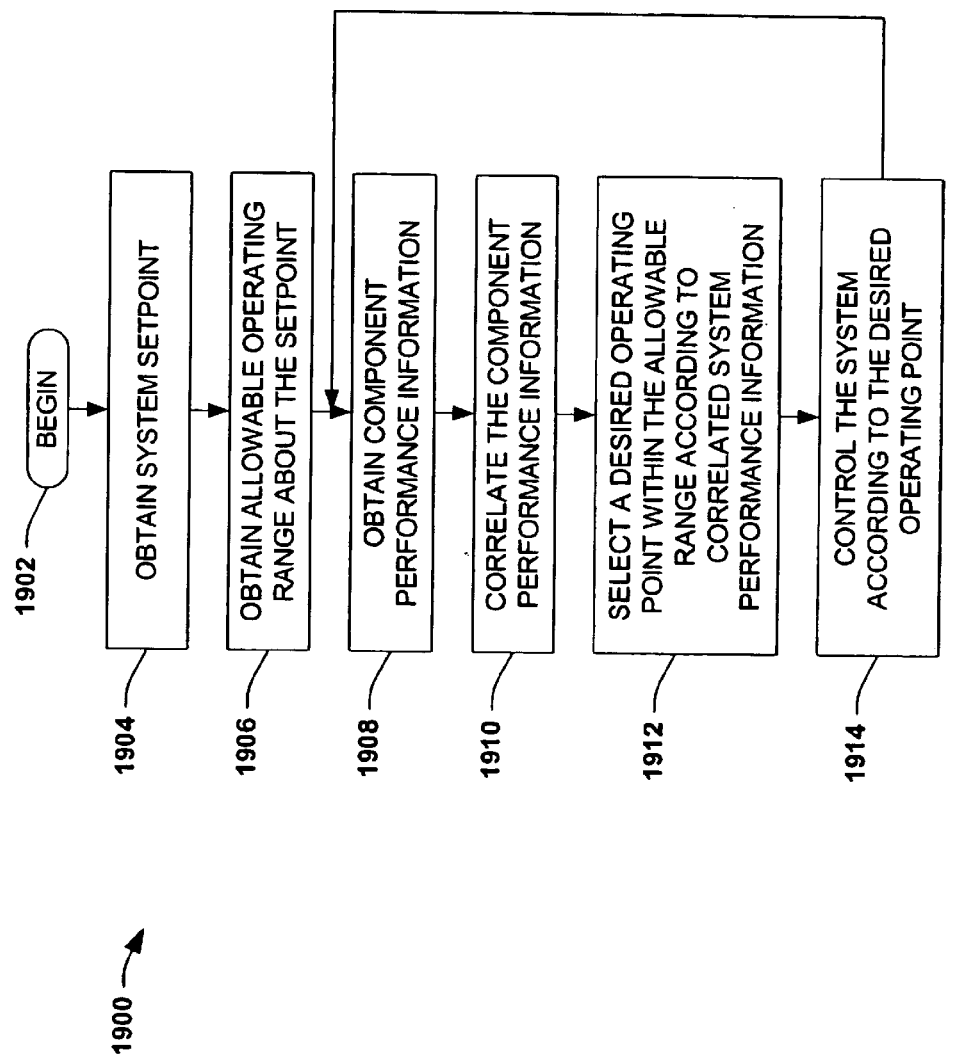
FIG. 19 is a flow diagram illustrating an exemplary method of controlling a motorized pump in accordance with another aspect of the invention.

An exemplary method 1900 is illustrated in FIG. 19 for controlling a motorized system in accordance with this aspect of the invention. While the exemplary method 1900 is illustrated and described herein as a series of blocks representative of various events and/or acts, the present invention is not limited by the illustrated ordering of such blocks. For instance, some acts or events may occur in different order and/or concurrently with other acts or events, apart from the ordering illustrated herein, in accordance with the invention. Moreover, not all illustrated blocks, events, or acts, may be required to implement a methodology in accordance with the present invention. In addition, it will be appreciated that the exemplary method 1900, as well as other methods according to the invention, may be implemented in association with the pumps and systems illustrated and described herein, as well as in association with other motorized systems and apparatus not illustrated or described, including but not limited to fans, conveyor systems, compressors, gear boxes, motion control devices, screw pumps, mixers, as well as hydraulic and pneumatic machines driven by motors or turbo generators.

Beginning at 1902, the method 1900 comprises obtaining a system setpoint at 1904, and obtaining an allowable operating range at 1906. The setpoint and operating range may be obtained at 1904 and 1906 from a user or a device such as a controller, a host computer, or the like, via a user interface, a network, an Internet connection, and/or via wireless communication. At 1908, component performance information is obtained, which may be related to components in the system and/or components in a larger process of which the controlled system is a part. Component performance information may be obtained from vendor data, from e-commerce web sites, from measured historical data, or from simulation and modeling or any combination of this these. The component performance information is then correlated at 1910 in order to derive correlated system performance information. At 1912, a desired operating point is selected in the allowable operating range, according to the correlated system performance information derived at 1910. The system is then controlled at 1914 according to the desired operating point, whereafter the method 1900 returns to 1908 as described above. Process changes, disturbances, updated prognostic information, revised energy costs, and other information may require periodic evaluation and appropriate control adjustment, in order to ensure meeting optimum performance levels as the process changes (e.g., tanks empty, temperature changes, or the like) and optimizing asset utilization.

Another aspect of the invention provides for controlling a motorized system, such as a pump, wherein a controller operatively associated with the system includes a diagnostic component to diagnose an operating condition associated with the pump. The operating conditions detected by the diagnostic component may include motor, motor drive, or pump faults, pump cavitation, pipe breakage or blockage, broken impeller blades, failing bearings, failure and/or degradation in one or more system components, sensors, or incoming power, and the like. The controller provides a control signal to the system motor drive according to a setpoint and a diagnostic signal from the diagnostic component according to the diagnosed operating condition in the pump. The diagnostic component may perform signature analysis of signals from one or more sensors associated with the pump or motorized system, in order to diagnose the operating condition. Thus, for example, signal processing may be performed in order to ascertain wear, failure, or other deleterious effects on system performance, whereby the control of the system may be modified in order to prevent further degradation, extend the remaining service life of one or more system components, or to prevent unnecessary stress to other system components. In this regard, the diagnostic component may process signals related to flow, pressure, current, noise, vibration, temperature, and/or other parameters of metrics associated with the motorized system. Such a system will be able to effectively control the remaining useful life of the motorized system.

Figure 20:
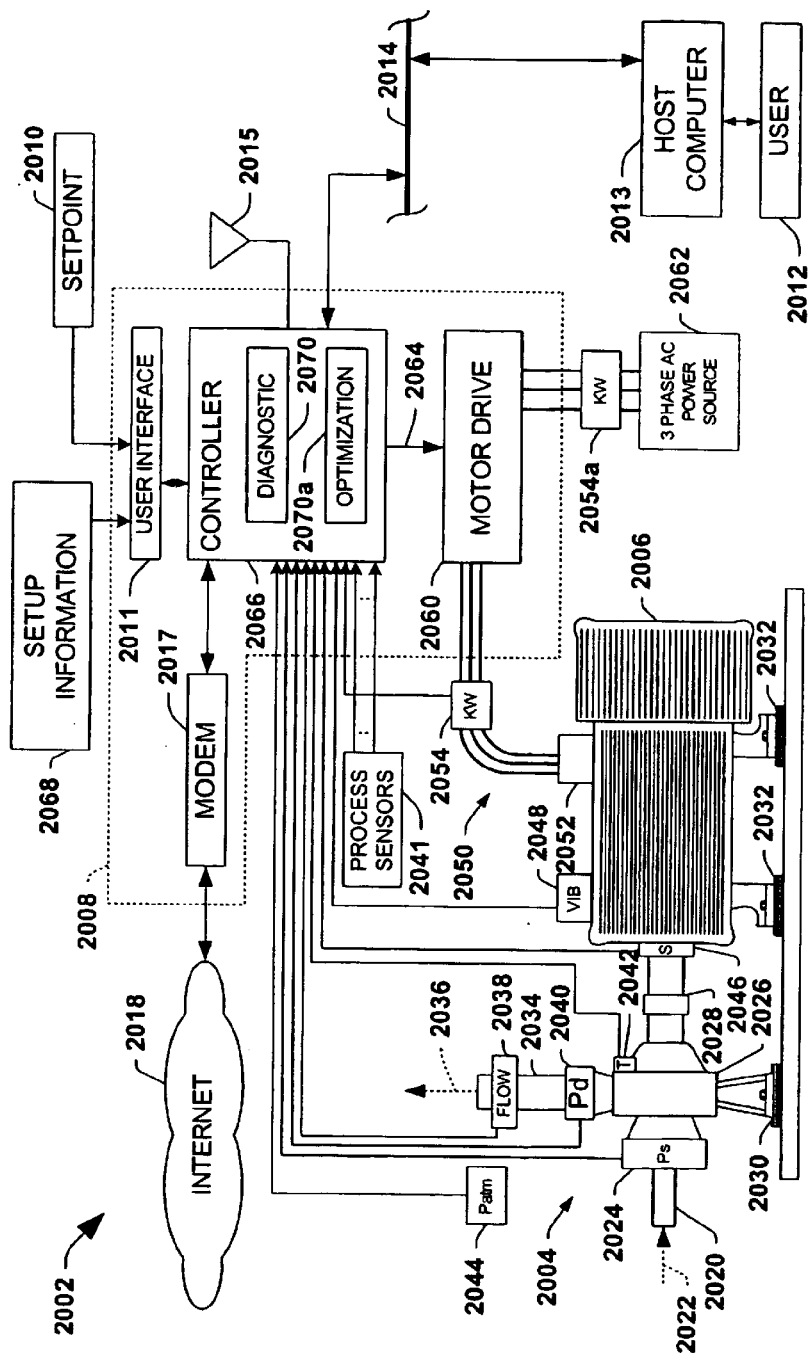
FIG. 20 is a side elevation view illustrating another exemplary motorized pump system and a control system therefor with a diagnostic component in accordance with another aspect of the invention.

Referring now to FIG. 20, another exemplary pump system 2002 is illustrated, in which one or more aspects of the invention may be carried out. The system 2002 includes a pump 2004, a three phase electric motor 2006, and a control system 2008 for operating the system 2002 in accordance with a setpoint 2010. While the exemplary motor 2006 is illustrated and described herein as a polyphase synchronous electric motor, the various aspects of the present invention may be employed in association with single-phase motors as well as with DC and other types of motors. In addition, the pump 2004 may comprise a centrifugal type pump, however, the invention finds application in association with other pump types not illustrated herein, for example, positive displacement pumps.

The control system 2008 operates the pump 2004 via the motor 2006 according to the setpoint 2010 and one or more measured process variables, in order to maintain operation of the system 2002 commensurate with the setpoint 2010 and within the allowable process operating ranges specified in setup information 2068, supplied to the control system 2008 via a user interface 2011. For example, it may be desired to provide a constant fluid flow, wherein the value of the setpoint 2010 is a desired flow rate in gallons per minute (GPM) or other engineering units. The setup information 2068, moreover, may comprise an allowable range of operation about the setpoint 2010 (e.g., expressed in GPM, percentage of process variable span, or other units), wherein the control system 2008 may operate the system 2002 at an operating point within the allowable range.

Alternatively or in combination, setup information, setpoints, and other information may be provided to the control system 2008 by a user 2012 via a host computer 2013 operatively connected to a network 2014, and/or by wireless communications via a transceiver 2015. Such information may be provided via the network 2014 and/or the wireless communications transceiver 2015 from a host computer (e.g., computer 2013) and/or from other controllers (e.g., PLCs, not shown) in a larger process, wherein the setpoint 2010, and/or setup information are provided to the control system 2008, as illustrated and described in greater detail hereinafter. The control system 2008, moreover, may include a modem 2017 allowing communication with other devices and/or users via a global communications network, such as the Internet 2018.

The pump 2004 comprises an inlet opening 2020 through which fluid is provided to the pump 2004 in the direction of arrow 2022 as well as a suction pressure sensor 2024, which senses the inlet or suction pressure at the inlet 2020 and provides a corresponding suction pressure signal to the control system 2008. Fluid is provided from the inlet 2020 to an impeller housing 2026 including an impeller (not shown), which rotates together with a rotary pump shaft coupled to the motor 2006 via a coupling 2028. The impeller housing 2026 and the motor 2006 are mounted in a fixed relationship with respect to one another via a pump mount 2030, and motor mounts 2032. The impeller with appropriate fin geometry rotates within the housing 2026 so as to create a pressure differential between the inlet 2020 and an outlet 2034 of the pump 2004. This causes fluid from the inlet 2020 to flow out of the pump 2004 via the outlet or discharge tube 2034 in the direction of arrow 2036. The flow rate of fluid through the outlet 2034 is measured by a flow sensor 2038, which provides a flow rate signal to the control system 2008.

In addition, the discharge or outlet pressure is measured by a pressure sensor 2040, which is operatively associated with the outlet 2034 and provides a discharge pressure signal to the control system 2008. It will be noted at this point that although one or more sensors (e.g., suction pressure sensor 2024, discharge pressure sensor 2040, outlet flow sensor 2038, and others) are illustrated in the exemplary system 2002 as being associated with and/or proximate to the pump 2004, that such sensors may be located remote from the pump 2004, and may be associated with other components in a process or system (not shown) in which the pump system 2002 is employed. In this regard, other process sensors 2041 may be connected so as to provide signals to the control system 2008, for example, to indicate upstream or downstream pressures, flows, temperatures, levels, or the like. Alternatively, flow may be approximated rather than measured by utilizing differential pressure information, pump speed, fluid properties, and pump geometry information or a pump model (e.g., CFD model). Alternatively or in combination, inlet and/or discharge pressure values may be estimated according to other sensor signals (e.g., 2041) and pump/process information.

In addition, it will be appreciated that while the motor drive 2060 is illustrated in the control system 2008 as separate from the motor 2006 and from the controller 2066, that some or all of these components may be integrated. Thus, for example, an integrated, intelligent motor may be provided with the motor 2006, the motor drive 2060 and the controller 2066. Furthermore, the motor 2006 and the pump 2004 may be integrated into a single unit (e.g., having a common shaft wherein no coupling 2028 is required), with or without integral control system (e.g., control system 2008, comprising the motor drive 2060 and the controller 2066) in accordance with the invention.

The control system 2008 further receives process variable measurement signals relating to pump temperature via a temperature sensor 2042, atmospheric pressure via a pressure sensor 2044 located proximate the pump 2004, motor (pump) rotational speed via a speed sensor 2046, and vibration via sensor 2048. The motor 2006 provides rotation of the impeller of the pump 2004 according to three-phase alternating current (AC) electrical power provided from the control system via power cables 2050 and a junction box 2052 on the housing of the motor 2006. The power to the pump 2004 may be determined by measuring the current provided to the motor 2006 and computing pump power based on current, speed, and motor model information. This may be measured and computed by a power sensor 2054 or 2054A, which provides a signal related thereto to the control system 2008. Alternatively or in combination, the motor drive 2060 may provide motor torque information to the controller 2066 where pump input power is calculated according to the torque and possibly speed information and motor model information.

The control system 2008 also comprises a motor drive 2060 providing three-phase electric power from an AC power source 2062 to the motor 2006 via the cables 2050 in a controlled fashion (e.g., at a controlled frequency and amplitude) in accordance with a control signal 2064 from a controller 2066. The controller 2066 receives the process variable measurement signals from the atmospheric pressure sensor 2044 (2054*a*), the suction pressure sensor 2024, the discharge pressure sensor 2040, the flow sensor 2038, the temperature sensor 2042, the speed sensor 2046, the vibration sensor 2048, the power sensor 2054, and other process sensors 2041, together with the setpoint 2010, and provides the control signal 2064 to the motor drive 2060 in order to operate the pump system 2002 commensurate with the setpoint 2010. In this regard, the controller 2066 may be adapted to control the system 2002 to maintain a desired fluid flow rate, outlet pressure, motor (pump) speed, torque, suction pressure, tank level, or other performance characteristic.

Setup information 2068 may be provided to the controller 2066, which may include operating limits (e.g., min/max speeds, min/max flows, min/max pump power levels, min/max pressures allowed, NPSHR values, and the like), such as are appropriate for a given pump 2004, motor 2006, and piping and process conditions. The controller 2066 comprises a diagnostic component 2070, which is adapted to diagnose one or more operating conditions associated with the pump 2004, the motor 2006, the motor drive 2060, and/or other components of system 2002. In particular the controller 2066 may employ the diagnostic component 2070 to provide the control signal 2064 to the motor drive 2060 according to setpoint 2010 and a diagnostic signal (not shown) from the diagnostic component 2070 according to the diagnosed operating condition in the pump 2004 or system 2002. In this regard, the diagnosed operating condition may comprise motor or pump faults, pump cavitation, or failure and/or degradation in one or more system components. The controller 2066 may further comprise an optimization component 2070*a*, operating in similar fashion to the optimization component 70 illustrated and described above.

The diagnostic component may advantageously perform signature analysis of one or more sensor signals from the sensors 2024, 2038, 2040, 2041, 2042, 2044, 2046, 2048, and/or 2054, associated with the pump 2004 and/or the system 2002 generally, in order to diagnose one or more operating conditions associated therewith. Such signature analysis may thus be performed with respect to power, torque, speed, flow, pressure, and other measured parameters in the system 2004 of in a larger process of which the system 2002 is a part. In addition, the signature analysis may comprise frequency analysis employing Fourier transforms, spectral analysis, space vector amplitude and angular fluctuation, neural networks, data fusion techniques, model-based techniques, discrete Fourier transforms (DFT), Gabor transforms, Wigner-Ville distributions, wavelet decomposition, non-linear filtering based statistical techniques, analysis of time series data using non-linear signal processing tools such as Poincare' maps and Lyapunov spectrum techniques, and other mathematical, statistical, and/or analytical techniques. The diagnostic features of the component 2070, moreover, may be implemented in hardware, software, and/or combinations thereof in the controller 2066.

Such techniques may be used to predict the future state or health of components in the system 2002 (e.g., and/or those of a larger system of which system 2002 is a part or with which system 2002 is associated). This prognostics will enable the control to be altered to redistribute stress, to control the time to failure, and/or the remaining useful life of one or more such components or elements. It will be appreciated that such techniques may be employed in a larger system, such as the system 300 of FIG. 10, for example, wherein a known or believed good component or sub-system may be overstressed to allow another suspected weakened component to last longer.

Although the invention has been shown and described with respect to certain illustrated aspects, it will be appreciated that equivalent alterations and modifications will occur to others skilled in the art upon the reading and understanding of this specification and-the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., functionally equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts or events of the various methods of the invention.

In addition, while a particular feature of the invention may have been disclosed with respect to only one of several implementations, such feature may be combined with one or more other features of the other implementations as may be desired and advantageous for any given or particular application. As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. Furthermore, to the extent that the terms "includes", "including", "has", "having", and variants thereof are used in either the detailed description or the claims, these terms are intended to be inclusive in a manner similar to the term "comprising."

What is claimed is:

1. A system that facilitates optimizing industrial business operations, comprising:

a component that receives data relating to diagnostics and prognostics of a subset of machines that are part of the industrial business operations;

a component that receives data relating to at least two of the following business related concerns: inventory, processes, accounting, finance, manufacturing, and utilities;

an optimization component that analyzes the machine data and the business concern data; and a regulating component that facilitates regulating the machines and business concerns based at least in part as a function of the analyzed data.

2. The system of claim 1, further comprising a host computer that executes the optimization component.

3. The system of claim 1, further comprising a host computer that executes the regulating component.

4. The system of claim 1, at least a subset of the components being executed in a distributed fashion across portions of the system.

5. The system of claim 1, the optimization component performing the analysis based in part upon at least one of: asset management and real options analysis as a factor.

6. The system of claim 1, the regulating component reducing operating rate of at least a subset of the machines.

7. The system of claim 1, the regulating component increasing operating rate of at least a subset of the machines.

8. The system of claim 1, at least a subset of the machines and/or components being represented by intelligent agents.

9. The system of claim 1, at least a subset of the machines and/or components being physically located remote from one another.

10. A computer readable medium storing the components of claim 1.

11. A method that facilitates asset optimization in an industrial automation environment, comprising:
   receiving and analyzing in real-time data relating to diagnoses and prognoses of operational aspects of a subset of machines that are part of the industrial automation system;
   modifying asset utilization in the industrial automation system based at least in part as a function of the analyzed diagnostic and prognostic machine data;
   selecting a desired operating point within an allowable range of operation about a system setpoint according to performance characteristics associated with at least one of the machines; and
   controlling at least one machine according to the desired operating point.

12. The method of claim 11, further comprising obtaining the system setpoint and the allowable range of operation from a user.

13. The method of claim 11, wherein selecting the desired operating point comprises:
   correlating at least two of motor efficiency information, pump efficiency information, and motor drive efficiency information in order to derive correlated system efficiency information; and
   selecting the desired operating point as the optimum efficiency point within the allowable range of operation according to the correlated system efficiency information.

14. The method of claim 13, wherein controlling the system according to the desired operating point comprises providing a motor speed signal to the motor drive according to the desired operating point.

15. The method of claim 13, further comprising obtaining at least one of the efficiency information, the allowable range, and the system setpoint from a user.

16. The method of claim 13, further comprising obtaining at least one of the efficiency information, the allowable range, and the system setpoint from a host computer.

17. The method of claim 16, wherein the at least one of the efficiency information, the allowable range, and the system setpoint is obtained via a network.

18. The method of claim 17, wherein the at least one of the efficiency information, the allowable range, and the system setpoint is obtained via wireless communications.

19. The method of claim 13, further comprising obtaining at least a portion of one of the efficiency information, the allowable range, and the system setpoint from prior operation of the system.

20. The method of claim 11, wherein selecting the desired operating point comprises:
   correlating component performance information associated with at least two components in the system in order to derive correlated system performance information; and
   selecting the desired operating point as the optimum performance point within the allowable range of operation according to the correlated system performance information.

21. The method of claim 20, wherein controlling the system according to the desired operating point comprises providing a setpoint to a controller associated with the system according to the desired operating point.

22. The method of claim 20, further comprising obtaining at least one of the performance information, the allowable range, and the system setpoint from a host computer.

23. The method of claim 22, wherein the at least one of the performance information, the allowable range, and the system setpoint is obtained via a network.

24. The method of claim 23, wherein the at least one of the performance information, the allowable range, and the system setpoint is obtained via wireless communications.

25. The method of claim 20, further comprising obtaining at least a portion of one of the performance information, the allowable range, and the system setpoint from prior operation of the system.

26. The method of claim 20, wherein the component performance information comprises at least one of life cycle cost information, efficiency information, life expectancy information, safety information, emissions information, operational cost information, MTBF information, noise information, and vibration information.

27. The method of claim 26, wherein the system comprises a motorized pump system for pumping fluid, having an electric motor operatively coupled with a pump, and a motor drive providing electrical power to the motor, wherein the component performance information comprises efficiency information related to at least two of the motor, the pump, and the motor drive, and wherein the correlated system performance information comprises cost information related to the system operational cost per unit of fluid pumped.

28. The method of claim 11, further comprising employing an options based analysis in connection with asset management.

29. The method of claim 28, further comprising automatically ordering an asset via the Internet.

30. The method of claim 11, wherein the system comprises a motorized pump system having an electric motor operatively coupled with a pump, and a motor drive providing electrical power to the motor, and wherein the performance characteristics associated with a plurality of components in the system comprises life expectancies of at least two of the motor, the pump, and the motor drive.

31. The method of claim 11, wherein the system comprises a motorized pump system having an electric motor operatively coupled with a pump, and a motor drive providing electrical power to the motor, and wherein the performance characteristics associated with a plurality of components in the system comprises cost of operation associated with at least two of the motor, the pump, and the motor drive.

32. The method of claim 11, wherein selecting the desired operating point comprises measuring at least one process variable from a sensor associated with the system.

33. A computer readable medium having stored thereon computer executable instructions for performing the method of claim 11.

* * * * *